(12) United States Patent
Ejiri et al.

(10) Patent No.: US 9,989,938 B2
(45) Date of Patent: Jun. 5, 2018

(54) COMMUNICATION DEVICE, CONTROL SYSTEM, AND COMMUNICATION METHOD

(71) Applicant: FUJITSU LIMITED, Kawasaki-shi, Kanagawa (JP)

(72) Inventors: Yusuke Ejiri, Kawasaki (JP); Megumi Nakata, Kawasaki (JP); Takeshi Fujiwara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 432 days.

(21) Appl. No.: 14/330,749

(22) Filed: Jul. 14, 2014

(65) Prior Publication Data
US 2015/0057766 A1 Feb. 26, 2015

(30) Foreign Application Priority Data

Aug. 22, 2013 (JP) .................. 2013-172715

(51) Int. Cl.
G06F 19/00 (2018.01)
G05B 15/02 (2006.01)

(52) U.S. Cl.
CPC ...... G05B 15/02 (2013.01); G05B 2219/2642 (2013.01)

(58) Field of Classification Search
USPC ......................................................... 700/14
See application file for complete search history.

(56) References Cited

U.S. PATENT DOCUMENTS

| 7,058,705 B1 | 6/2006 | Fukasawa et al. | |
| 7,469,291 B2* | 12/2008 | Hammell | G06F 21/41 709/225 |
| 7,511,845 B2* | 3/2009 | Inikori | G06Q 10/06 358/1.15 |
| 7,650,399 B2 | 1/2010 | Fukasawa et al. | |
| 7,773,248 B2* | 8/2010 | Kadota | G03G 15/55 358/1.15 |

(Continued)

FOREIGN PATENT DOCUMENTS

| JP | 2002-170171 | 6/2002 |
| JP | 2005-295029 | 10/2005 |

(Continued)

OTHER PUBLICATIONS

CNOA—Office Action of Chinese Patent Application No. 2014103683811.8 dated Dec. 19, 2016, with English translation.

(Continued)

Primary Examiner — Kidest Bahta
(74) Attorney, Agent, or Firm — Fujitsu Patent Center

(57) ABSTRACT

A communication device includes a determining unit and a sending unit. The determining unit determines, when setting information related to a predetermined item is received from a predetermined apparatus, whether another piece of setting information related to the predetermined item is newly received from the predetermined apparatus before a predetermined time period elapses after the setting information is received. The sending unit sends, when the determining unit determines that the another piece of setting information is not newly received from the predetermined apparatus before the predetermined time period elapses, the setting information to a server device.

3 Claims, 16 Drawing Sheets

(56) References Cited

U.S. PATENT DOCUMENTS

| | | | | |
|---|---|---|---|---|
| 8,291,217 | B2* | 10/2012 | Miyazawa | H04L 63/0823 358/1.14 |
| 9,542,836 | B2* | 1/2017 | Fujita | F24F 3/065 |
| 2003/0079613 | A1* | 5/2003 | Williamson | A47J 31/52 99/282 |
| 2004/0002779 | A1* | 1/2004 | Shimba | G05B 19/042 700/90 |
| 2004/0107717 | A1* | 6/2004 | Yoon | F24F 11/006 62/230 |
| 2005/0246408 | A1* | 11/2005 | Chung | H04L 12/2803 709/200 |
| 2006/0233392 | A1* | 10/2006 | Koyanagi | H03H 17/06 381/98 |
| 2007/0012052 | A1* | 1/2007 | Butler | F24F 11/0009 62/181 |
| 2010/0106315 | A1* | 4/2010 | Grohman | F24F 11/006 700/276 |
| 2010/0257158 | A1* | 10/2010 | Sugaya | H04L 12/2809 707/723 |
| 2012/0159235 | A1* | 6/2012 | Suganthi | G06F 11/2028 714/4.11 |

FOREIGN PATENT DOCUMENTS

| | | |
|---|---|---|
| JP | 3787465 | 6/2006 |
| JP | 2007-288447 | 11/2007 |
| JP | 2011-078026 | 4/2011 |
| JP | 2012-123825 | 6/2012 |

OTHER PUBLICATIONS

JPOA—Office Action of Japanese Patent Application No. 2013-172715 dated May 30, 2017, with English translation.

JPOA—Notification of Reasons for Refusal of Japanese Patent Application No. 2013-172715, dated Apr. 4, 2017, with machine translation.

\* cited by examiner

FIG.5

| APPARATUS ID | PROPERTY NAME | RECEIPT DATE | RECEIPT TIME |
|---|---|---|---|
| C01 | SETTING TEMPERATURE | 2013/03/05 | 10:52:30:8 |
| A01 | SETTING BRIGHTNESS | 2013/03/05 | 12:06:30:5 |
| B01 | SETTING AIRFLOW VOLUME | 2013/03/05 | 12:08:42:2 |
| ⋮ | ⋮ | ⋮ | ⋮ |

| APPARATUS ID | PROPERTY NAME | VALUE |
|---|---|---|
| A01 | SETTING BRIGHTNESS | 100% |
| C01 | SETTING TEMPERATURE | 27°C |

| APPARATUS ID | MANUFACTURER CODE | PRODUCT CODE | PROPERTY NAME | NOTIFICATION BLOCK TIMER VALUE | HISTORY ACQUISITION FLAG |
|---|---|---|---|---|---|
| A01 | AAA | LightA1 | SETTING BRIGHTNESS | 1.2 SEC. | 0 |
| C01 | CCC | AirconC3 | SETTING TEMPERATURE | 1.0 SEC. | 1 |
| A01 | AAA | LightA1 | POWER SUPPLY ON/OFF | 0 SEC. | 0 |
| ⋮ | ⋮ | ⋮ | ⋮ | ⋮ | ⋮ |

23

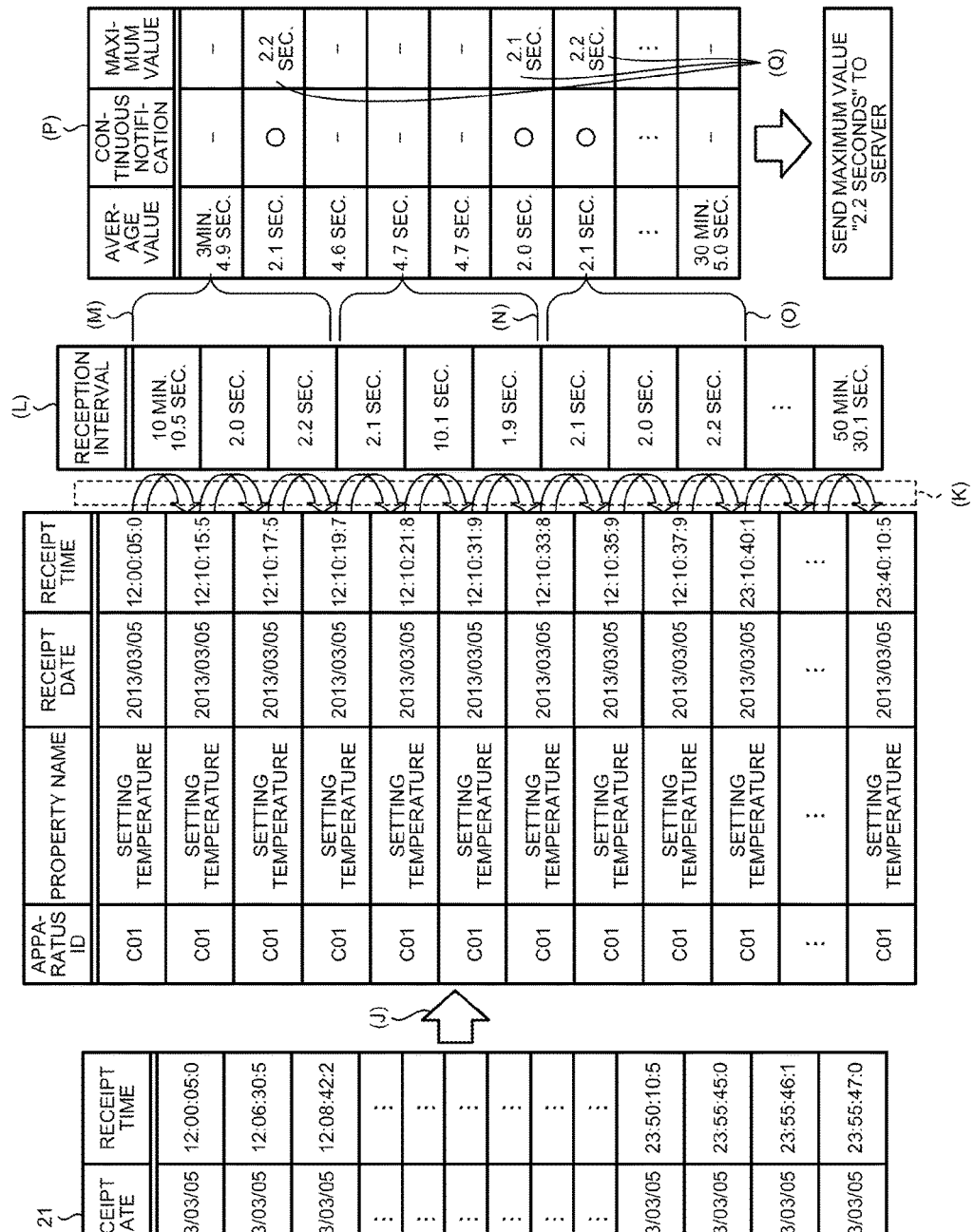

FIG.11

| MANUFAC-TURER CODE | PRODUCT CODE | PROPERTY NAME | NOTIFICATION BLOCK TIMER VALUE | HISTORY ACQUISITION FLAG | GWID |
|---|---|---|---|---|---|
| AAA | LightA1 | SETTING BRIGHTNESS | 1.2 SEC. | 0 | GW#1 |
| BBB | AirconB2 | SETTING TEMPERATURE | 2.5 SEC. | 1 | GW#1, GW#2 |
| BBB | AirconB2 | SETTING AIRFLOW VOLUME | 1.5 SEC. | 0 | GW#3 |
| CCC | AirconC3 | SETTING TEMPERATURE | 1.0 SEC. | 0 | GW#2 |
| ⋮ | ⋮ | ⋮ | ⋮ | ⋮ | ⋮ |

FIG.12

| MANUFAC-TURER CODE | PRODUCT CODE | PROPERTY NAME | GWID | APPA-RATUS ID | DATE | TIME ZONE | RECEP-TION IN-TERVAL |
|---|---|---|---|---|---|---|---|
| CCC | AirconC3 | SETTING TEMPERATURE | GW#1 | C01 | 2013/03/05 | 00:00 TO 12:00 | 1.5 SEC. |
| AAA | LightA1 | SETTING BRIGHTNESS | GW#1 | A02 | 2013/03/05 | 00:00 TO 12:00 | 1.2 SEC. |
| BBB | AirconB2 | SETTING TEMPERATURE | GW#2 | B01 | 2013/03/05 | 00:00 TO 12:00 | 2.5 SEC. |
| ⋮ | ⋮ | ⋮ | ⋮ | ⋮ | ⋮ | ⋮ | ⋮ |
| BBB | AirconB2 | SETTING TEMPERATURE | GW#100 | B01 | 2013/03/06 | 12:00 TO 24:00 | 2.5 SEC. |

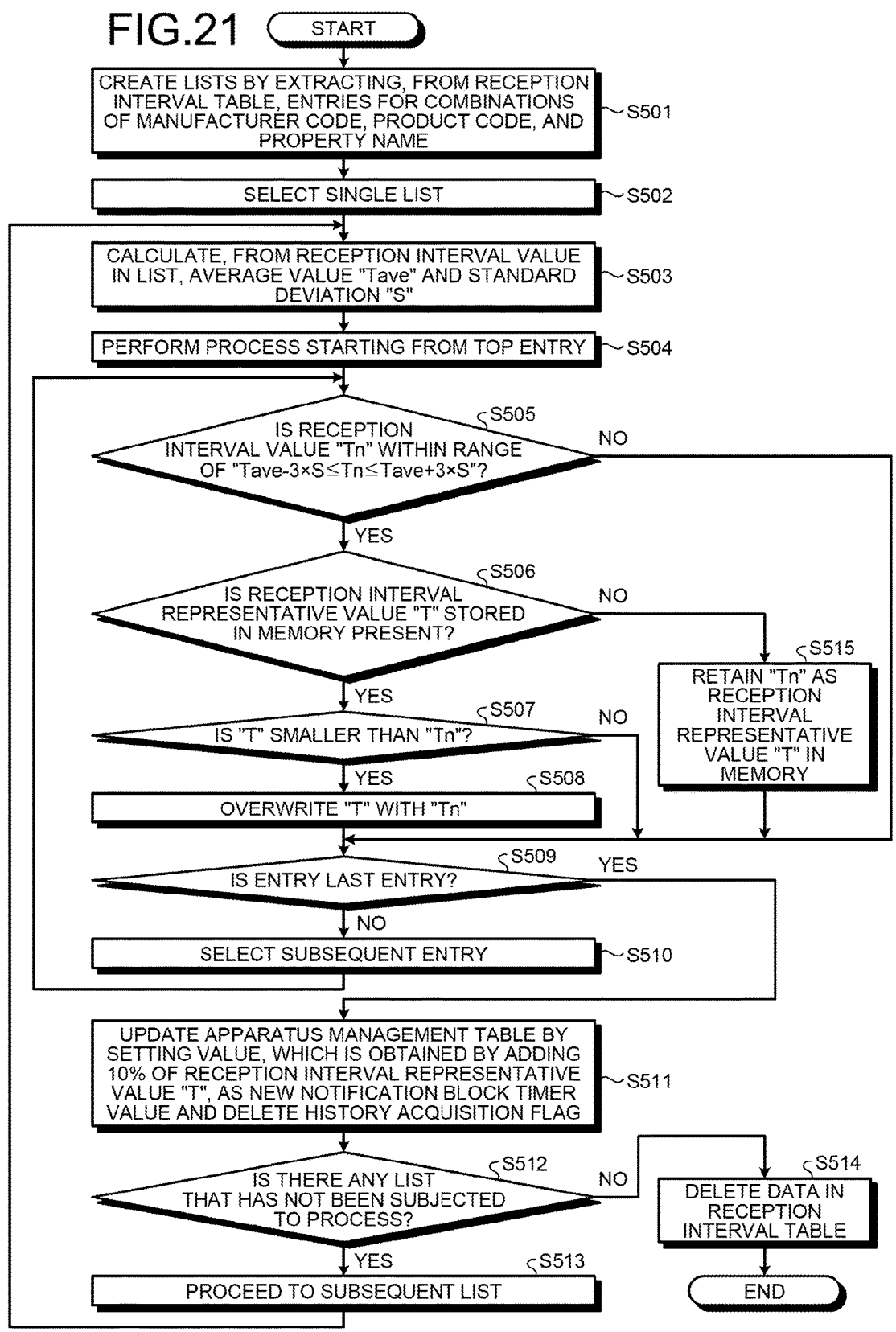

COMMUNICATION DEVICE, CONTROL SYSTEM, AND COMMUNICATION METHOD

CROSS-REFERENCE TO RELATED APPLICATION(S)

This application is based upon and claims the benefit of priority of the prior Japanese Patent Application No. 2013-172715, filed on Aug. 22, 2013, the entire contents of which are incorporated herein by reference.

FIELD

The embodiments discussed herein are related to a communication device, a control system, and a communication method.

BACKGROUND

There is a known conventional technology of a control system in which apparatuses installed in homes are connected, via a gateway, to a control server on a network and the control server controls each of the apparatuses. There is a known technology, as an example of such control system, in which, when a setting of an apparatus is changed, the apparatus sends a notification about the changed setting content to a control server and the control server controls other apparatuses in accordance with the changed setting content indicated by the notification that has been received from the target apparatus. See for example, Japanese Laid-open Patent Publication No. 2002-170171 and Japanese Laid-open Patent Publication No. 2001-043161.

However, with the technology in which notifications indicating the changed setting content are sequentially sent to the control server every time a setting is changed in the target apparatus, when settings are continuously changed, a notification indicating a setting content that has not been determined is also sent to the control server. Consequently, there is a problem in that the control server performs an unwanted process. Furthermore, a notification from an apparatus in which the setting content has not been firmly determined is unwanted traffic to the control server.

For example, an example of a known air conditioning apparatus installed in a home includes an air conditioning apparatus in which setting temperatures are set in stages by pressing an up/down button. Furthermore, a conceivable example of a service provided by a control system includes a service in which, when a setting temperature that has been set in an air conditioning apparatus is changed, the setting temperature in the other air conditioning apparatuses installed in the same home is also changed in accordance with the changed setting temperature.

At this point, when a user changes a setting temperature to a target temperature by continuously pressing the up/down button, some air conditioning apparatus sequentially sends, in addition to the final setting temperature to the control server, notifications about setting temperatures of intermediate stages. Consequently, because the control server controls the other air conditioning apparatuses in accordance with the notification that indicates the setting temperature that has not been determined, the control server performs wasteful control. Furthermore, intermediate notifications are unwanted traffic for the network.

SUMMARY

According to an aspect of an embodiment, a communication device includes a determining unit and a sending unit. The determining unit determines, when setting information related to a predetermined item is received from a predetermined apparatus, whether another piece of setting information related to the predetermined item is newly received from the predetermined apparatus before a predetermined time period elapses after the setting information is received. The sending unit sends, when the determining unit determines that the another piece of setting information is not newly received from the predetermined apparatus before the predetermined time period elapses, the setting information to a server device.

According to another aspect of an embodiment, a control system includes a server device and multiple communication devices. The server device controls multiple apparatuses installed in multiple homes. The multiple communication devices each sends a notification to the server device indicating that an apparatus installed in one of the multiple homes has been changed. Each of the communication devices includes a determining unit and a sending unit. The determining unit determines, when setting information related to a predetermined item is received from a predetermined apparatus, whether another piece of setting information related to the predetermined item is newly received from the predetermined apparatus before a predetermined time period elapses after the setting information is received. The sending unit sends, when the determining unit determines that the another piece of setting information is not newly received from the predetermined apparatus before the predetermined time period elapses, the setting information to the server device. The server device includes a control unit that controls the predetermined apparatus on the basis of the setting information sent from one of the communication devices.

According to still another aspect of an embodiment, a communication method includes: determining, performed by a communication device that sends a notification to a server device indicating that a setting of a predetermined apparatus has been changed, when setting information related to a predetermined item is received from the predetermined apparatus, whether another piece of setting information related to the predetermined item is newly received from the predetermined apparatus before a predetermined time period elapses after the setting information is received; and sending, performed by the communication device, when it is determined that the another piece of setting information is not newly received from the predetermined apparatus before the predetermined time period elapses, the setting information to the server device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating an example of a reception history table;

FIG. 6 is a schematic diagram illustrating an example of a state change notification temporary saving table;

FIG. 7 is a schematic diagram illustrating an example of a connection apparatus management table;

FIG. 8 is a schematic diagram illustrating an example of a process that creates a reception interval notification;

FIG. 11 is a schematic diagram illustrating an example of an apparatus management table;

FIG. 12 is a schematic diagram illustrating an example of a reception interval table;

FIG. 21 is a flowchart illustrating a flow of a process in which the control server according to the first embodiment determines a notification block timer value.

DESCRIPTION OF EMBODIMENTS

Preferred Embodiments of the Present Invention will be explained with reference to accompanying drawings. The technology disclosed in the present invention is not limited to the embodiments described below. Furthermore, the embodiments can be used in any appropriate combination as long as they do not conflict with each other.

[a] First Embodiment

Figure 1:
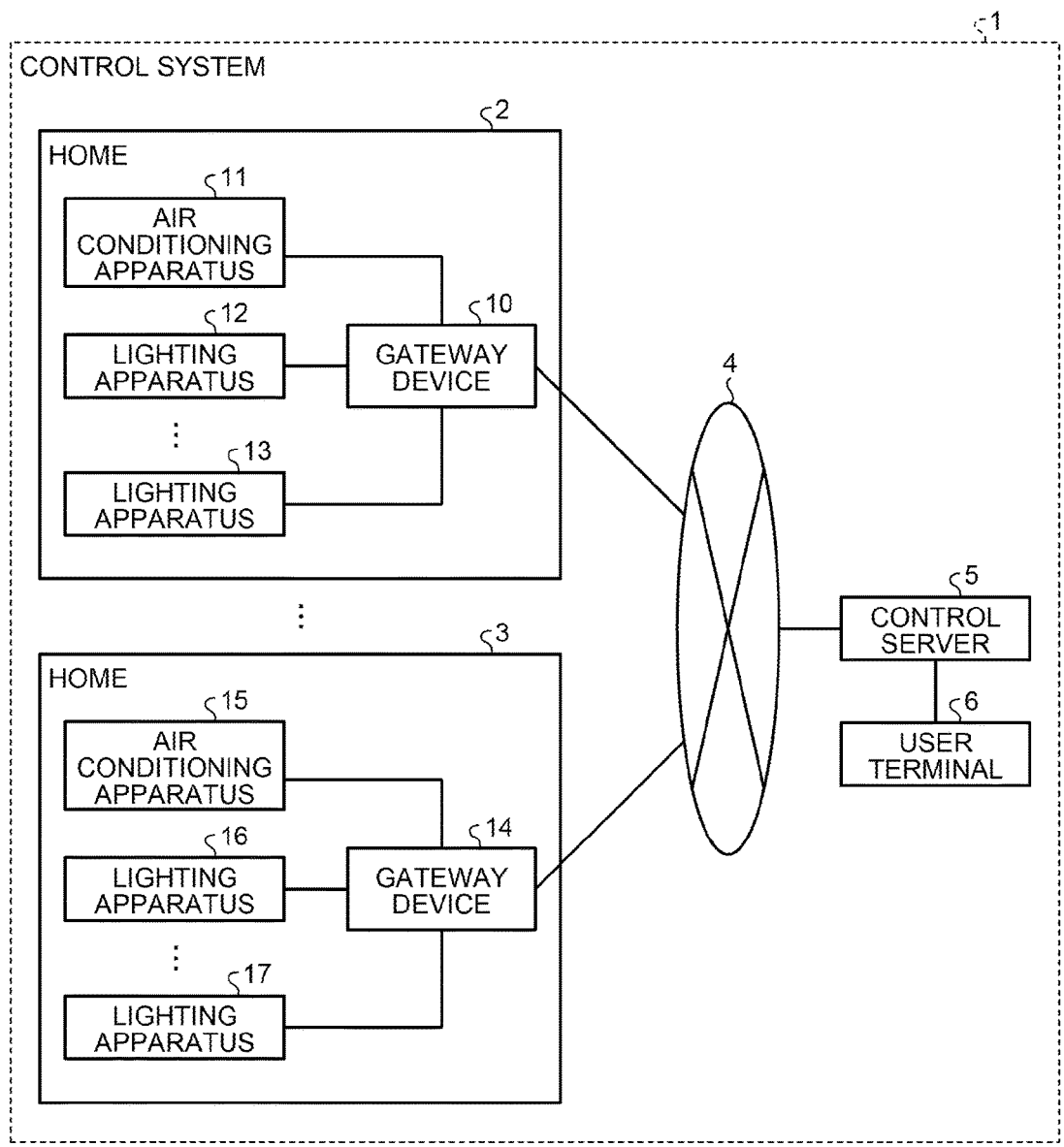
FIG. 1 is a schematic diagram illustrating a control system according to a first embodiment.

In a first embodiment described below, an example of a control system according to the present invention will be described with reference to FIG. 1. FIG. 1 is a schematic diagram illustrating a control system according to a first embodiment. As illustrated in FIG. 1, a control system 1 includes a home 2, a home 3, a network 4, a control server 5, and a user terminal 6. Although not illustrated in FIG. 1, the control system 1 may also additionally include the same home as the homes 2 and 3.

The home 2 includes a gateway device 10, an air conditioning apparatus 11, a lighting apparatus 12, and a lighting apparatus 13. Furthermore, the home 3 includes a gateway device 14, an air conditioning apparatus 15, a lighting apparatus 16, and a lighting apparatus 17. Furthermore, in addition to the air conditioning apparatuses 11 and 15 and the lighting apparatuses 12, 13, 16, and 17, each of the homes 2 and 3 may also include an apparatus that has an arbitrary function.

For example, each of the homes 2 and 3 may also include various home appliances, such as a hot water supply apparatus that controls hot water, a network device that controls a network, a power distribution apparatus that distributes electrical power to each room, a refrigerator, and the like. In a description below, it is assumed that the gateway device 14, the air conditioning apparatus 15, and the lighting apparatuses 16, 17 have the same functions as those performed by the gateway device 10, the air conditioning apparatus 11, and the lighting apparatuses 12 and 13; therefore, descriptions thereof will be omitted. Furthermore, in a description below, the air conditioning apparatus 11 and the lighting apparatuses 12 and 13 may sometimes be each referred to as the apparatus 11, 12, 13.

The air conditioning apparatus 11 is an air conditioning apparatus that is installed in the home 2 and that receives a change in a setting temperature in stages. For example, the air conditioning apparatus 11 receives, one by one, a change in a setting temperature when an up/down button arranged on a remote controller that is used to operate the air conditioning apparatus 11 is pressed. Then, every time a setting temperature is changed, the air conditioning apparatus 11 sends a state change notification that indicates the changed setting temperature to the gateway device 10 via an arbitrary communication path, such as a wired local area network (LAN), a wireless LAN, a Bluetooth (registered trademark), or the like.

The lighting apparatuses 12 and 13 are lighting apparatuses that are installed in the home 2 and that receives, in stages, a change in the brightness. For example, the lighting apparatus 12 receives a change in the brightness every "1%" unit when the up/down button arranged on an operation panel for operating the lighting apparatus 12 is pressed, where the minimum brightness of the electric light is defined as "0%" and the maximum brightness of the electric light is defined as "100%". Then, the lighting apparatus 12 sends, to the gateway device 10 via an arbitrary communication path, a state change notification that indicates the changed setting brightness.

At this point, each of the apparatuses 11 to 13 stores therein an apparatus ID (Identification) that is an identifier of each of the apparatuses 11 to 13, a manufacturer code, and a product code. The manufacturer code mentioned here is an identification number that is uniquely added by a manufacturer to each of the apparatuses 11 to 13. The product code mentioned here is identification information, such as a product name, that is uniquely added by a manufacturer to each of the apparatuses 11 to 13. When the apparatuses 11 to 13 are newly installed in the home 2, each of the apparatuses 11 to 13 outputs an apparatus detection notification including an apparatus ID to the gateway device 10. Then, when an acquisition request for apparatus information is received from the gateway device 10, each of the apparatuses 11 to 13 sends a response that includes a manufacturer code and a product code to the gateway device 10.

Furthermore, if various settings are changed, each of the apparatuses 11 to 13 sends, to the gateway device 10, a state change notification that includes an apparatus ID, a property name that indicates the changed setting item, and the changed set value. For example, if the setting temperature is changed from "26° C." to "27° C.", the air conditioning apparatus 11 sends to the gateway device 10, a state change notification that includes the apparatus ID of "C01" that indicates the air conditioning apparatus 11, the property name of "setting temperature" that indicates a change in a setting temperature, and a changed value of "27° C.". Furthermore, in a description below, the setting item that is targeted for a change, such as a setting temperature that is set in the air conditioning apparatus 11, the setting brightness of each of the lighting apparatuses 12 and 13, or the like, is referred to as a property.

The gateway device 10 sends a state change notification received from one of the apparatuses 11 to 13 to the control server 5 via the network 4. Furthermore, when the gateway device 10 receives, from the control server 5 via the network 4, a control instruction that instructs control of each of the apparatuses 11 to 13, the gateway device 10 outputs the received control instruction to each of the apparatuses 11 to 13. Consequently, each of the apparatuses 11 to 13 changes the brightness or the setting temperature in accordance with the received control instruction.

The network 4 is an arbitrary network, such as a wide area LAN, the Internet, or the like. Furthermore, the control server 5 is a control server that controls each of the apparatuses 11 to 13 and 15 to 17. For example, if the setting brightness of the lighting apparatus 12 is changed, the control server 5 receives a state change notification that indicates the changed setting brightness via the gateway device 10 and the network 4. In such a case, the control server 5 calculates the setting brightness of the lighting apparatus 13 in accordance with the value of the setting brightness that is indicated by the received state change notification and then sends, to the gateway device 10, a control instruction that instructs to change the setting brightness set in the lighting apparatus 13 to the calculated setting brightness. Specifically, in the first embodiment, in accordance with the setting brightness of the lighting apparatus 12, the control server 5 adjusts and controls the setting brightness of the lighting apparatus 13 that is the other apparatus.

At this point, when the gateway device 10 notifies the control server 5 of the changed setting temperature or the changed setting brightness every time the gateway device 10 receives a notification, such as the changed setting temperature or the changed setting brightness, from each of the apparatuses 11 to 13, the gateway device 10 allows the control server 5 to perform an unwanted process. For example, assume that a user continuously changes the setting brightness of the lighting apparatus 12 from "50%" to "60%" every "1%" unit. In such a case, it is sufficient if the control server 5 calculates the setting brightness of the lighting apparatus 13 in accordance with the final setting brightness "60%" of the lighting apparatus 12.

However, the lighting apparatus 12 notifies the gateway device 10 of the setting brightness between "50%" and "60%" every 1% unit. Consequently, if the gateway device 10 notifies the control server 5 of each piece of the setting brightness that is received from the lighting apparatus 12 as a notification, the gateway device 10 allows the control server 5 to perform an unwanted process, which is a problem. Furthermore, at this time, unwanted communication traffic occurs between the gateway device 10 and the control server 5, which may be a cause of network congestion.

Accordingly, the gateway device 10 performs the following process. For example, when the gateway device 10 receives a state change notification in which the setting brightness is used as a property from the lighting apparatus 12, the gateway device 10 waits for a predetermined time period after the gateway device 10 received the state change notification. Furthermore, when the gateway device 10 again receives a state change notification in which setting brightness is used as a property from the lighting apparatus 12 during a standby time period, i.e., before the predetermined time period elapses after the state change notification was received, the gateway device 10 waits for the predetermined time period after the state change notification was received again.

Then, if the gateway device 10 does not receive again a state change notification in which the setting brightness is used as a property from the lighting apparatus 12 before the predetermined time period has elapsed since the state change notification was received, the gateway device 10 sends the state change notification received from the lighting apparatus 12 to the control server 5. Specifically, from among the state change notifications in which the setting brightness received from the lighting apparatus 12 is used as the property, the gateway device 10 sends the last received state change notification to the control server 5. Consequently, because the gateway device 10 notifies the control server 5 of only the value of the final property, the gateway device 10 can reduce an unwanted process performed by the control server 5. Furthermore, the gateway device 10 can reduce the amount of traffic from the gateway device 10 to the control server 5.

Furthermore, for the property, such as on/off of a power supply, that is not changed in the lighting apparatus 12 in stages, when the property is changed, the gateway device 10 immediately notifies the control server 5 of the property, without waiting for a predetermined time period. Consequently, for the state change notification of the property that is not continuously changed, the gateway device 10 promptly notifies the control server 5 of the property without waiting.

Figure 2:
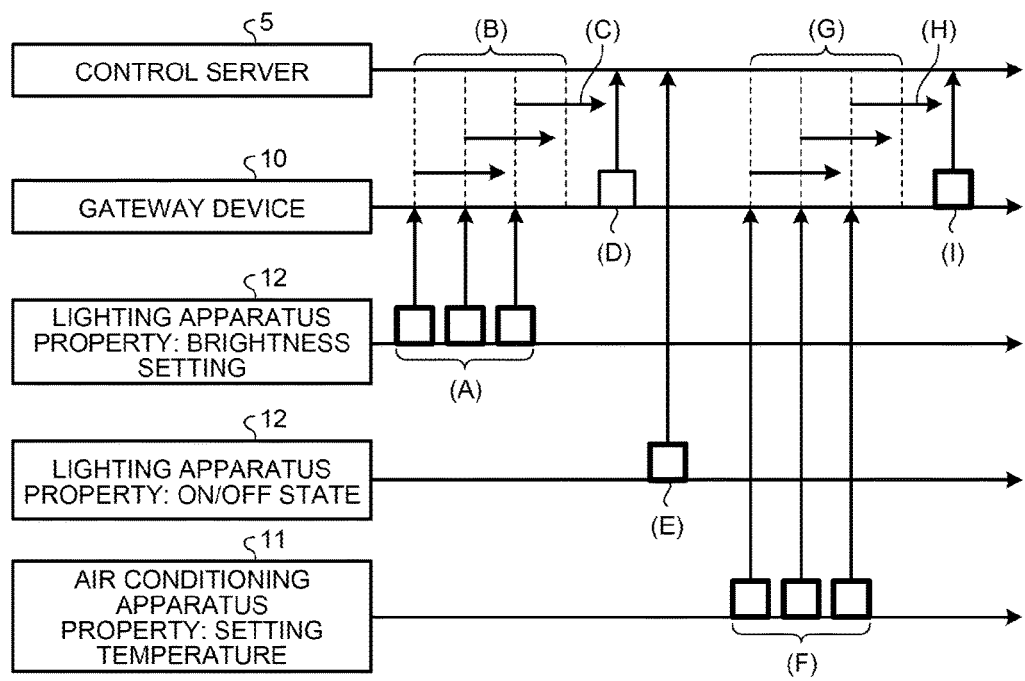
FIG. 2 is a schematic diagram illustrating an example of a process that blocks notifications.

In the following, a process that blocks a notification that is sent by the gateway device 10 to the control server 5 will be described with reference to FIG. 2. FIG. 2 is a schematic diagram illustrating an example of a process that blocks notifications. FIG. 2 illustrates an example of a timing at which a state change notification is sent to the control server 5 when the gateway device 10 receives a state change notification in which the setting brightness of a lighting apparatus is used as the property and a state change notification in which the ON/OFF state of a power supply is used as the property. Furthermore, FIG. 2 illustrates an example of a timing at which a state change notification is sent to the control server 5 when the gateway device 10 receives a state change notification in which a setting temperature is used as the property from the air conditioning apparatus 11.

For example, as illustrated by (A) in FIG. 2, when a change in the setting brightness is continuously performed three times, such as a case in which the setting brightness is changed from "50%" to "53%" with a notification that is issued every 1% unit, the lighting apparatus 12 continuously sends three state change notifications in each of which the setting brightness is used as the property to the gateway device 10 (the arrow in the upward direction illustrated in FIG. 2). In such a case, as illustrated by (B) in FIG. 2, the gateway device 10 waits for a predetermined time period every time the gateway device 10 receives the state change notifications (the arrow in the horizontal and right direction illustrated in FIG. 2). Consequently, the gateway device 10 does not send the first and the second state change notifications to the control server 5 because the gateway device 10 receives the second and the third state change notifications, in which the setting brightness is used as the property, during a predetermined standby time after the gateway device 10 received each of the state change notifications.

In contrast, as illustrated by (C) in FIG. 2, if the gateway device 10 does not receive a new state change notification in which the setting brightness is used as the property from the lighting apparatus 12 within a predetermined time period after the gateway device 10 received the third state change notification, the gateway device 10 sends, to the control server 5 as illustrated by (D) in FIG. 2, the last state change notification received from the lighting apparatus 12.

In contrast, as illustrated by (E) in FIG. 2, the lighting apparatus 12 sends a state change notification in which the ON/OFF state of a power supply is used as the property to the gateway device 10. In such a case, because the ON/OFF state of the power supply is not the continuously changed property, after the gateway device 10 receives the state change notification in which the ON/OFF state of the power supply is used as the property from the lighting apparatus 12, the gateway device 10 sends the state change notification without processing anything to the control server 5. As described above, the operation performed by the gateway device 10 may be changed in accordance with the property.

Furthermore, as illustrated by (F) in FIG. 2, if a setting temperature is continuously changed three times, such as a case in which a setting temperature is changed from "25° C." to "28° C." every one degree, the air conditioning apparatus 11 continuously sends, to the gateway device 10, the three state change notifications in each of which the setting temperature is used as the property. In such a case, as illustrated by (G) in FIG. 2, the gateway device 10 waits for a predetermined time period every time the gateway device 10 receives the state change notification (the arrow in the horizontal and right direction illustrated in FIG. 2). Consequently, the gateway device 10 does not send the first and the second state change notifications to the control server 5 because the gateway device 10 receives the second and the third state change notifications in each of which the setting temperature is used as the property within a predetermined standby time after the gateway device 10 received each of the state change notifications.

Then, as illustrated by (H) in FIG. 2, if the gateway device 10 does not receive a new state change notification in which a setting temperature is used as the property from the air conditioning apparatus 11 within a predetermined time period after the gateway device 10 received the third state change notification, the gateway device 10 performs the following process. Namely, as illustrated by (I) in FIG. 2, the gateway device 10 sends the last state change notification received from the air conditioning apparatus 11 to the control server 5.

Figure 3:
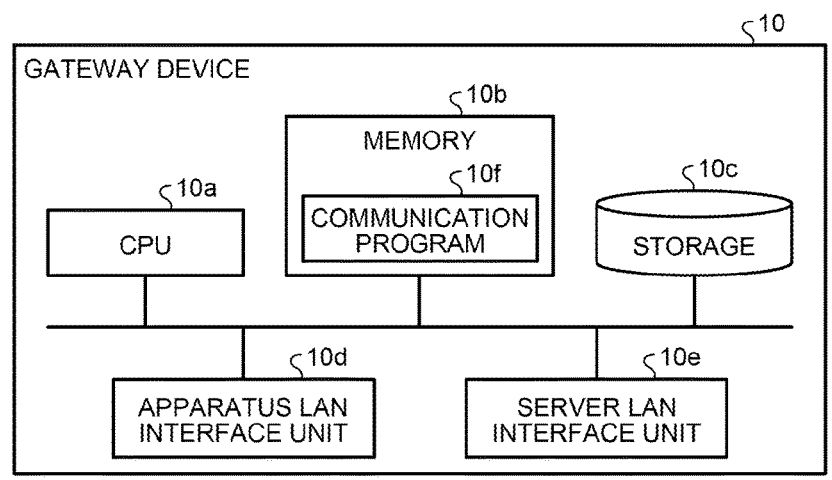
FIG. 3 is a schematic diagram illustrating an example of the configuration of hardware in a gateway device according to the first embodiment.

In the following, a specific example of the gateway device 10 will be described with reference to the drawings. First, an example of the configuration of hardware in the gateway device 10 will be described with reference to FIG. 3. FIG. 3 is a schematic diagram illustrating an example of the configuration of hardware in a gateway device according to the first embodiment. For example, the gateway device 10 includes a central processing unit (CPU) 10a, a memory 10b, storage 10c, and an apparatus LAN interface unit 10d, and a server LAN interface unit 10e. The memory 10b stores therein a communication program 10f.

The CPU 10a is an arithmetic processing unit that executes various kinds of arithmetic processing. For example, by executing, for example, a control program that controls the gateway device 10, the CPU 10a executes the overall control of the gateway device 10. The memory 10b is a semiconductor memory device, such as a dual inline memory module (DIMM), a flash memory, or the like, and stores therein the control program executed by the CPU 10a and data that is used by the CPU 10a for the arithmetic processing. The storage 10c is a storage device, such as a hard disk drive (HDD), a solid state drive (SSD), or the like.

The apparatus LAN interface unit 10d is a communication interface that controls communication between the gateway device 10 and each of the apparatuses 11 to 13 installed in the home 2. For example, the apparatus LAN interface unit 10d sends and receives data to and from each of the apparatuses 11 to 13 via a communication path, such as a wired LAN, a wireless LAN, Bluetooth (registered trademark), or the like. Furthermore, the server LAN interface unit 10e is a communication interface used by the gateway device 10 to control communication with the control server 5 via the network 4.

Figure 4:
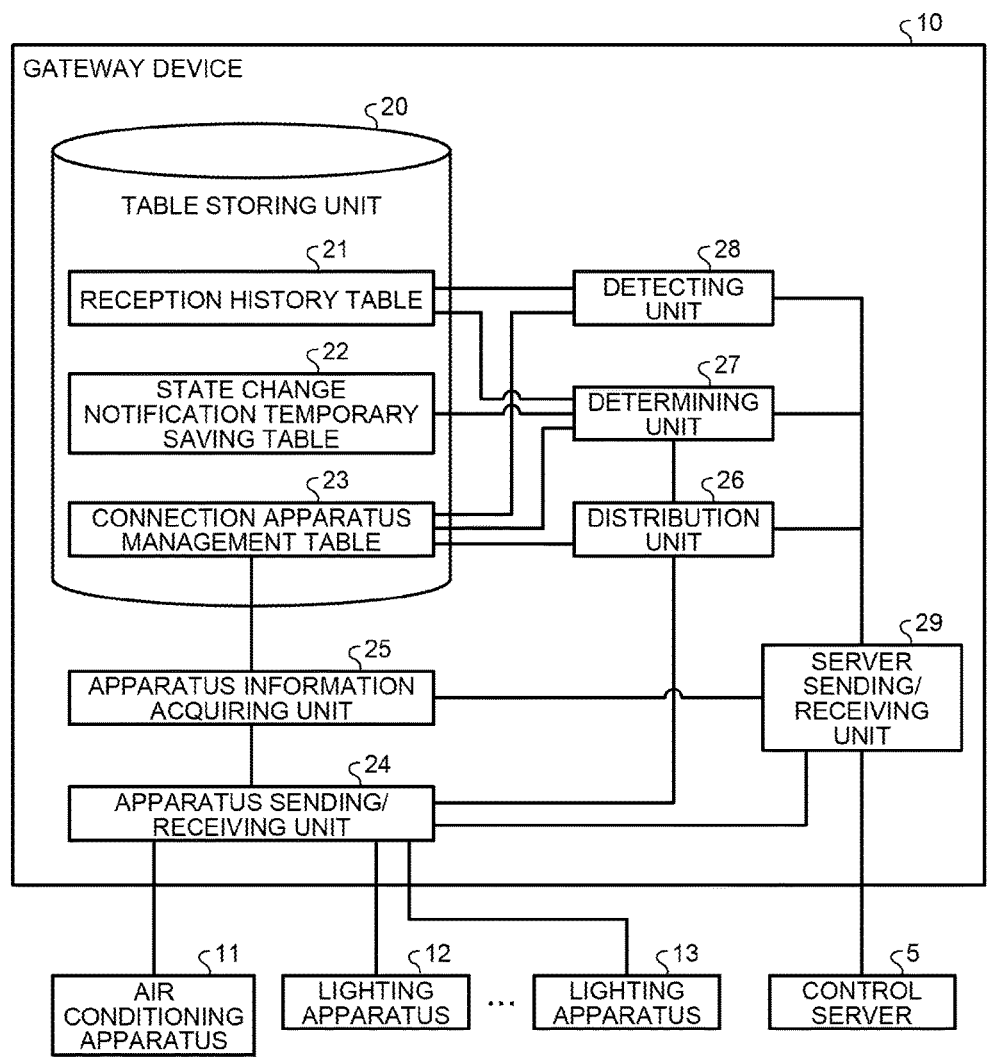
FIG. 4 is a schematic diagram illustrating a functional configuration of the gateway device according to the first embodiment.

At this point, the CPU 10a executes the communication program 10f stored in the memory 10b, thereby the gateway device 10 operates as a device that has the functional configuration illustrated in FIG. 4. In the following, an example of the functional configuration of the gateway device 10 that executes the communication program 10f will be described with reference to FIG. 4.

FIG. 4 is a schematic diagram illustrating the functional configuration of the gateway device according to the first embodiment. In the example illustrated in FIG. 4, the gateway device 10 includes a table storing unit 20, an apparatus sending/receiving unit 24, an apparatus information acquiring unit 25, a distribution unit 26, a determining unit 27, a detecting unit 28, and a server sending/receiving unit 29. Furthermore, the table storing unit 20 stores therein a reception history table 21, a state change notification temporary saving table 22, and a connection apparatus management table 23. The table storing unit 20 is, for example, a storage area that is set in the memory 10b.

In the following, a description will be given of information stored in the reception history table 21, the state change notification temporary saving table 22, and the connection apparatus management table 23 stored in the table storing unit 20. The reception history table 21 stores therein, in an associated manner, the time at which a state change notification is received from each of the apparatuses 11 to 13 and apparatus information that indicates an apparatus that is the send source of the state change notification.

For example, FIG. 5 is a schematic diagram illustrating an example of the reception history table 21. In the example illustrated in FIG. 5, the reception history table 21 stores therein, in an associated manner, the apparatus ID that is used as identification information on an apparatus, the property name that is used as identification information on the notification attribute, the receipt date, and the receipt time. For example, the reception history table 21 stores therein the apparatus ID of "C01" that indicates the air conditioning apparatus 11 illustrated in FIG. 1, the property name of "setting temperature", the receipt date of "2013/03/05", and the receipt time of "10:52:30:8". Accordingly, the reception history table 21 indicates that a state change notification in which a setting temperature is used as the property is received from the air conditioning apparatus 11 at 10:52:30:8 on Mar. 5, 2013.

Furthermore, the reception history table 21 stores therein, in an associated manner, the apparatus ID of "A01" that indicates the lighting apparatus 12 illustrated in FIG. 1, the property name of "setting brightness" indicating that the setting brightness has been changed, the receipt date of "2013/03/05", and the receipt time of "12:06:30:5". Accordingly, the reception history table 21 indicates that a state change notification in which the setting brightness is used as the property is received from the lighting apparatus 12 at 12:06:30:5 on Mar. 5, 2013.

Furthermore, the reception history table 21 stores therein, in an associated manner, the apparatus ID of "B01" that indicates an air conditioning apparatus (not illustrated), the property name of "setting airflow volume" indicating that the airflow volume has been changed, the receipt date of "2013/03/05", and the receipt time of "12:08:42:2". Accordingly, the reception history table 21 indicates that a state change notification in which the airflow volume is used as the property is received from the air conditioning apparatus at 12:08:42:2 on Mar. 5, 2013.

A description will be given here by referring back to FIG. 4. The state change notification temporary saving table 22 stores therein, for each combination of an apparatus and the property, the latest state change notification from among the state change notifications received from the apparatuses 11 to 13. For example, FIG. 6 is a schematic diagram illustrating an example of the state change notification temporary saving table 22. As illustrated in FIG. 6, the state change notification temporary saving table 22 stores therein a state change notification that includes the apparatus ID, the property name, and the value indicating the latest state of the notified property.

For example, in the example illustrated in FIG. 6, the state change notification temporary saving table 22 stores therein the state change notification that includes therein the apparatus ID of "A01", the property name of "setting brightness", and the value of "100%" and stores therein the state change notification that includes therein the apparatus ID of "C01", the property name of "setting temperature", and the value of "27° C.".

A description will be given here by referring back to FIG. 4. The connection apparatus management table 23 stores therein management information that is used to manage each of the apparatuses 11 to 13 connected to the control server 5 via the gateway device 10. For example, FIG. 7 is a schematic diagram illustrating an example of the connection apparatus management table 23. As illustrated in FIG. 7, the connection apparatus management table 23 stores therein, in an associated manner as the management information on each of the apparatuses 11 to 13, the apparatus ID, the manufacturer code, the product code, the property name, the notification block timer value, and the history acquisition flag.

The notification block timer value mentioned here is the standby time for which, when the gateway device 10 receives a state change notification that includes an associated combination of the apparatus ID and the property name, the gateway device 10 waits for the arrival of the subsequent state change notification. Furthermore, the notification block timer value mentioned here is a value calculated by the gateway device 10 or a value calculated, by the control server 5, on the basis of the information received from each of the gateway devices 10 and 14.

Furthermore, the history acquisition flag mentioned here is a flag indicating whether the associated notification block timer value is a statically appropriate notification block timer value in the control system 1. As will be described later, for the notification block timer value associated with the history acquisition flag of "1", the control server 5 performs the following process at a predetermined timing. Namely, the control server 5 collects reception interval candidate values on the basis of the time intervals at which each of the gateway devices 10 and 14 receives a state change notification and then calculates, on the basis of the collected reception interval candidate values, a statically appropriate notification block timer value in the control system 1. Then, the control server 5 notifies each of the gateway devices 10 and 14 of the calculated notification block timer value.

For example, in FIG. 7, the connection apparatus management table 23 stores therein, in an associated manner, the apparatus ID of "A01", the manufacturer code of "AAA", the product code of "LightA1", the property name of "setting brightness", the notification block timer value of "1.2 seconds", the history acquisition flag of "0". Furthermore, the connection apparatus management table 23 stores therein the apparatus ID of "A01", the manufacturer code of "AAA", the product code of "LightA1", the property name of "power supply ON/OFF", the notification block timer value of "0 second", and the history acquisition flag of "0". Furthermore, the connection apparatus management table 23 stores therein, in an associated manner, the apparatus ID of "C01", the manufacturer code of "CCC", the product code of "AirconC3", the property name of "setting temperature", and the notification block timer value of "1.0 second", and the history acquisition flag of "1".

A description will be given here by referring back to FIG. 4. The apparatus sending/receiving unit 24 sends and receives data to and from each of the apparatuses 11 to 13. For example, if the air conditioning apparatus 11 is newly installed in the home 2, the apparatus sending/receiving unit 24 receives an apparatus detection notification that includes therein the apparatus ID from the air conditioning apparatus 11. In such a case, the apparatus sending/receiving unit 24 outputs the received apparatus detection notification to the apparatus information acquiring unit 25.

Furthermore, when the apparatus sending/receiving unit 24 receives an acquisition request for apparatus information from the apparatus information acquiring unit 25, the apparatus sending/receiving unit 24 sends the received acquisition request for the apparatus information to one of the apparatuses 11 to 13 that corresponds to the sending destination. Then, when the apparatus sending/receiving unit 24 receives a response to the acquisition request for the apparatus information from one of the apparatuses 11 to 13, the apparatus sending/receiving unit 24 outputs the received response to the apparatus information acquiring unit 25.

Furthermore, when the apparatus sending/receiving unit 24 receives a state change notification from one of the apparatuses 11 to 13, the apparatus sending/receiving unit 24 outputs the received state change notification to the distribution unit 26. Furthermore, when the apparatus sending/receiving unit 24 receives a control instruction for one of the apparatuses 11 to 13 from the server sending/receiving unit 29, the apparatus sending/receiving unit 24 sends the control instruction to the apparatus that is the sending destination for the control instruction.

The apparatus information acquiring unit 25 acquires apparatus information on each of the apparatuses 11 to 13. For example, when the apparatus information acquiring unit 25 receives an apparatus detection notification from the apparatus sending/receiving unit 24, the apparatus information acquiring unit 25 extracts the apparatus ID from the apparatus detection notification and then sends, to the apparatus sending/receiving unit 24, an acquisition request for apparatus information in which the apparatus indicated by the extracted apparatus ID is used as the destination. In such a case, each of the apparatuses 11 to 13 outputs a response that includes the manufacturer code and the product code to the gateway device 10. Then, when the apparatus information acquiring unit 25 receives a response to the acquisition request from each of the apparatuses 11 to 13 via the apparatus sending/receiving unit 24, the apparatus information acquiring unit 25 extracts a manufacturer code and a product code from the response.

Furthermore, the apparatus information acquiring unit 25 creates an acquisition request for a notification block timer value including the extracted manufacturer code and the product code and requests the server sending/receiving unit 29 to send the created acquisition request for the notification block timer value to the control server 5. Furthermore, the apparatus information acquiring unit 25 receives a response to the acquisition request for the notification block timer value from the control server 5 via the server sending/receiving unit 29. In such a case, the apparatus information acquiring unit 25 determines whether the notification block timer value is included in the received response.

If the notification block timer value is included in the received response, the apparatus information acquiring unit 25 extracts, from the received response, the property name, the notification block timer value, and the history acquisition flag. Then, the apparatus information acquiring unit 25 stores, in an associated manner in the connection apparatus management table 23, the extracted apparatus ID, the manufacturer code, the product code, the property name, the notification block timer value, and the history acquisition flag. In contrast, if the notification block timer value is not included in the received response, the apparatus information acquiring unit 25 ends the process without creating the entry illustrated in FIG. 7 as an example.

Furthermore, if the control server 5 updates the apparatus information, the apparatus information acquiring unit 25 receives, from the server sending/receiving unit 29, update data that is the updated apparatus information. In such a case, the apparatus information acquiring unit 25 updates, in accordance with the received update data, the apparatus information stored in the connection apparatus management table 23.

For example, the apparatus information acquiring unit 25 extracts the combination of manufacturer code, the product code, and the property name included in the update data and then identifies, from the connection apparatus management table 23, an entry in which the extracted combination is stored. Then, the apparatus information acquiring unit 25 updates the notification block timer value and the value of the history acquisition flag that are stored in the identified entry to the notification block timer value and the value of the history acquisition flag that are included in the update data.

The distribution unit 26 determines whether the newly received state change notification is a state change notification related to the continuously changed property and then distributes the state change notification in accordance with the determination result. For example, when the distribution unit 26 receives a state change notification from the apparatus sending/receiving unit 24, the distribution unit 26 extracts the apparatus ID, the property name, and the value from the received state change notification. Furthermore, the distribution unit 26 searches the connection apparatus management table 23 for an entry in which a combination of the extracted apparatus ID and the property name is stored.

Furthermore, when the distribution unit 26 searches for the entry in which the combination of the extracted apparatus ID and the property name is stored, the distribution unit 26 determines whether the notification block timer value in the searched entry is "0 second". If the notification block timer value in the searched entry is not "0 second", the distribution unit 26 outputs the received state change notification to the determining unit 27. Specifically, the distribution unit 26 outputs the state change notification related to the continuously changed property to the determining unit 27.

In contrast, if the notification block timer value in the searched entry is "0 second", the distribution unit 26 outputs the received state change notification to the server sending/receiving unit 29. Specifically, the distribution unit 26 immediately sends, to the control server 5, the state change notification related to the property that is not continuously changed without waiting for the arrival of a new state change notification.

In the following, an example of a process performed by the distribution unit 26 will be described. In the example described below, it is assumed that the connection apparatus management table 23 stores therein information illustrated in FIG. 7 as an example. For example, the distribution unit 26 receives the state change notification in which the apparatus ID of "A01", the property name of "setting brightness", and the value of "100%" are stored. In such a case, the distribution unit 26 searches the connection apparatus management table 23 for an entry in which a combination of the apparatus ID of "A01" and the property name of "setting brightness" is stored and then detects the first entry illustrated as an example in FIG. 7. Because the value of the notification block timer in the detected entry is "1.2 seconds", the distribution unit 26 outputs the received and detected state change notification to the determining unit 27.

In contrast, for example, the distribution unit 26 receives the state change notification in which the apparatus ID of "A01", the property name of "power supply ON/OFF", and the value that indicates "ON" are stored. In such a case, the distribution unit 26 searches the connection apparatus management table 23 for an entry in which a combination of the apparatus ID of "A01" and the property name of "power supply ON/OFF" are stored and then detects the third entry illustrated as an example in FIG. 7. Because the value of the notification block timer in the detected entry is "0 second", the distribution unit 26 outputs the received state change notification to the server sending/receiving unit 29.

The determining unit 27 determines whether a state change notification related to the same property name is received from the same apparatus within a predetermined time period after the state change notification related to the continuously changed property has been received. If the determining unit 27 determines that a state change notification related to the same property name is received from the same apparatus within a predetermined time period after the state change notification related to the continuously changed property has been received, the determining unit 27 performs the following process. Namely, the determining unit 27 outputs the last received state change notification to the server sending/receiving unit 29.

In the following, a process performed by the determining unit 27 will be described in detail. First, the determining unit 27 receives a state change notification related to a continuously changed property name from the distribution unit 26. In such a case, the determining unit 27 determines whether a state change notification related to the same property is received from the same apparatus. For example, the determining unit 27 extracts, from the state change notification, a combination of the apparatus ID of the apparatus that is the send source of the received state change notification and the property name of the property that is targeted for a change and then determines whether the state change notification that includes the extracted combination of the apparatus ID and the property name is stored in the state change notification temporary saving table 22.

If the state change notification that includes the extracted combination of the apparatus ID and the property name is not stored in the state change notification temporary saving table 22, the determining unit 27 performs the following process. First, the determining unit 27 stores the received state change notification in the state change notification temporary saving table 22. Furthermore, the determining unit 27 searches the connection apparatus management table 23 for an entry that includes therein the combination of the apparatus ID and the property name extracted from the received state change notification.

If the history acquisition flag in the searched entry is "1", the determining unit 27 stores, in an associated manner in the reception history table 21, a combination of the apparatus ID and the property name extracted from the searched state change notification, receipt date of the received state change notification, and the receipt time and then continues to perform the process. In contrast, if the history acquisition flag in the searched entry is "0", the determining unit 27 continues to perform the process without storing the receipt date and the receipt time of state change notification in the reception history table 21.

Subsequently, the determining unit 27 acquires the value in the notification block timer value in the entry searched from the connection apparatus management table 23 and counts the time indicated by the acquired notification block timer value. Specifically, for each combination of the apparatus ID and the property name extracted from the state change notification, the determining unit 27 counts the time indicated by the acquired notification block timer value. Furthermore, if the determining unit 27 receives a new state change notification, the determining unit 27 determines whether a notification block timer value related to the combination of the apparatus ID and the property name extracted from the new state change notification is being counted.

If a notification block timer value related to the combination of the apparatus ID and the property name extracted from the new state change notification is being counted, the determining unit 27 stores the newly received state change notification in the state change notification temporary saving table 22 and resets the value of the counter for the extracted combination of the apparatus ID and the property name. In contrast, if a notification block timer value related to the combination of the apparatus ID and the property name extracted from the new state change notification is not being counted, the determining unit 27 stores the received state change notification in the state change notification temporary saving table 22 and counts the notification block timer value for the combination of the apparatus ID and the property name extracted from the new state change notification.

In contrast, if the determining unit 27 does not receive the subsequent state change notification when the notification block timer value is being counted, the determining unit 27 outputs the received state change notification to the server sending/receiving unit 29. Furthermore, the determining unit 27 deletes, from the state change notification temporary saving table 22, the output state change notification.

For example, if a user continuously changes various settings of each of the apparatuses 11 to 13, the gateway device 10 continuously receives state change notifications each of which stores therein a combination of the same apparatus ID and the property name. Consequently, every time the determining unit 27 receives a state change notification that includes the same combination of the apparatus ID and the property name, the determining unit 27 overwrites the data with the state change notification temporary saving table 22, stores the data, and resets the value that is being counted. When the counting has been completed, the determining unit 27 outputs the last received state change notification to the server sending/receiving unit 29.

In the following, as an example of a process performed by the determining unit 27, a description will be given of a process performed by the determining unit 27 when a setting temperature in the air conditioning apparatus 11 is changed from "28° C." to "26° C." every one degree. Furthermore, in a description below, it is assumed that the connection apparatus management table 23 stores therein the information illustrated in FIG. 7.

For example, the determining unit 27 receives the state change notification in which the apparatus ID of "C01", the property name of "setting temperature", and the value of "27° C." are stored. In such a case, the determining unit 27 stores the received state change notification in the state change notification temporary saving table 22. Consequently, for example, in the state change notification temporary saving table 22, the information on the third entry illustrated in FIG. 7 is stored.

Then, the determining unit 27 refers to the connection apparatus management table 23 and then determines that the value of the history acquisition flag in the entry that includes therein the combination of the apparatus ID of "C01" and the property name of "setting temperature", i.e., in the third entry illustrated in FIG. 7, is "1". Consequently, the determining unit 27 stores, in the reception history table 21, the apparatus ID "C01", the property name of "setting temperature", the receipt date on which the state change notification is received, and the receipt time at which the state change notification is received. Furthermore, the determining unit 27 identifies the notification block timer value of "1.2 seconds" that is associated with the combination of the apparatus ID of "C01" and the property name of "setting temperature" and then starts to count the identified notification block timer value of "1.2 seconds".

Furthermore, it is assumed that the determining unit 27 receives, as the subsequent state change notification, a state change notification in which the apparatus ID of "C01", the property name of "setting temperature", and the value of "26° C." are stored within "1.2 seconds" after the determining unit 27 received the previous state change notification. At this point, in the state change notification temporary saving table 22, the state change notification in which the apparatus ID of "C01" and the property name of "setting temperature" are included, i.e., the previous state change notification is stored. Consequently, the determining unit 27 overwrites the previous state change notification stored in the state change notification temporary saving table 22 with the newly received state change notification. For example, the determining unit 27 updates the value of "27° C." that is associated with the combination of the apparatus ID of "C01" and the property name of "setting temperature" to "26° C.". Then, the determining unit 27 re-starts counting the time indicated by the notification block timer value of "1.2 seconds".

When the determining unit 27 ends the counting of the time indicated by the notification block timer value of "1.2 seconds", the determining unit 27 outputs the state change notification stored in the state change notification temporary saving table 22 to the server sending/receiving unit 29 and then deletes the state change notification stored in the state change notification temporary saving table 22. For example, if the determining unit 27 does not receive the subsequent state change notification within "1.2 seconds" after the determining unit 27 received the state change notification in which the value of "26° C." is stored, the determining unit 27 outputs the state change notification in which the value of "26° C." is stored to the server sending/receiving unit 29.

Furthermore, the determining unit 27 independently performs the process described above for each combination of the apparatus ID and the property name. For example, even if the determining unit 27 receives the state change notification that includes therein the apparatus ID of "A01" and the property name of "setting brightness" when the determining unit 27 waits for the subsequent state change notification that includes therein the apparatus ID of "C01" and the property name of "setting temperature", the determining unit 27 does not reset the count. Then, the determining unit 27 counts a new notification block timer value as the standby time for the subsequent state change notification that includes therein the apparatus ID of "A01" and the property name of "setting brightness".

The detecting unit 28 calculates, for each combination of the apparatus ID and the property name, a time interval for the arrival of a state change notification and then outputs a reception interval notification that indicates the calculated time interval to the server sending/receiving unit 29. Specifically, the detecting unit 28 refers to the reception history table 21 at intervals of, for example, 12 hours and then extract, for each combination of the apparatus ID and the property name, the receipt date and the receipt time. Then, the detecting unit 28 calculates, from the extracted receipt date and the receipt time, a reception interval that is the time interval of the receptions of the state change notification.

At this point, the reception interval of the receptions of the state change notifications includes therein, in addition to the reception interval when a user continuously changes the setting, the reception interval when the user sporadically changes the setting. Accordingly, by using the average value of some of the calculated reception intervals, the detecting unit 28 extracts the reception intervals used when the user continuously changes the setting. Then, the detecting unit 28 creates a reception interval notification that indicates the maximum reception interval from among the extracted reception intervals and then outputs the created reception interval notification to the server sending/receiving unit 29.

In the following, a specific example of a process performed by the detecting unit 28 will be described with reference to FIG. 8. FIG. 8 is a schematic diagram illustrating an example of a process that creates a reception interval notification. For example, as illustrated by (J) in FIG. 8, the detecting unit 28 extracts, from the reception history table 21, the entries in which the apparatus ID of "C01" and the property name of "setting temperature" are stored. Then, as illustrated by (K) in FIG. 8, the detecting unit 28 calculates the difference of the receipt date and the receipt time between the entries. Consequently, as illustrated by (L) in FIG. 8, the detecting unit 28 calculates a reception interval of receptions of state change notifications that include the apparatus ID of "C01" and the property name of "setting temperature".

At this point, the detecting unit 28 calculates the average value of some of the reception intervals. For example, the detecting unit 28 selects three reception intervals of the continuous state change notifications in time series. Furthermore, the detecting unit 28 calculates the average value of the selected three reception intervals. Then, the detecting unit 28 determines whether, by using the average value as the median value, the values of the selected three reception intervals are within the upper limit and the lower limit of the range of ±10% of the average value. If the difference between the selected three reception interval values and the calculated average value are within the range of ±10% of the average value, the detecting unit 28 determines that the selected three reception intervals are the reception intervals when the settings are continuously changed.

For example, as illustrated by (M) in FIG. 8, the detecting unit 28 calculates the average value "3 minutes and 4.9 seconds" of the three reception intervals of "10 minutes and 10.5 seconds", "2.0 seconds", and "2.2 seconds"; where, when the average value of "3 minutes and 4.9 seconds" is used as the median value, the upper limit and the lower limit of the range of ±10% of the average value "3 minutes and 4.9 seconds" is between "2 minutes and 46.5 seconds" and "3 minutes and 23.3 seconds". Consequently, the detecting unit 28 determines that the selected three reception intervals of "10 minutes and 10.5 seconds", "2.0 seconds", and "2.2 seconds" are not the reception intervals when the settings are continuously changed.

Furthermore, for example, as illustrated by (N) in FIG. 8, the detecting unit 28 calculates the average value "4.7 seconds" of the three reception intervals of "2.1 seconds", "10.1 seconds", and "1.9 seconds"; where, when the average value of "4.7 seconds" is used as the median value, the upper limit and the lower limit of the range of ±10% of the average value of "4.7 seconds" is between "4.3 seconds" and "5.1 seconds". Consequently, the detecting unit 28 determines that the selected three reception intervals "2.1 seconds", "10.1 seconds", and "1.9 seconds" are not the reception intervals when the settings are continuously changed.

In contrast, for example, as illustrated by (O) in FIG. 8, the detecting unit 28 calculates the average value "2.1 seconds" of the three reception intervals "2.1 seconds", "2.0 seconds", and "2.2 seconds"; where, when the average value of "2.1 seconds" is used as the median value, the upper limit and the lower limit of the range of ±10% of the average value of "2.1 seconds" is between "1.9 seconds" and "2.3 seconds". Consequently, the detecting unit 28 determines that the three reception intervals "2.1 seconds", "2.0 seconds", and "2.2 seconds" are the reception intervals when the settings are continuously changed. In such a case, the detecting unit 28 determines that the maximum value of the three reception intervals "2.1 seconds", "2.0 seconds", and "2.2 seconds" is "2.2 seconds".

Furthermore, as illustrated by (P) in FIG. 8, the detecting unit 28 performs the process described above on all of the combinations in the four continuously received state change notifications. Then, as illustrated by (Q) in FIG. 8, the detecting unit 28 extracts the maximum reception interval from among the reception intervals that are determined to be the reception intervals when the settings are continuously changed. In the example illustrated by (Q) in FIG. 8, the maximum reception interval is "2.2 seconds".

Consequently, the detecting unit 28 creates, via the server sending/receiving unit 29, a reception interval notification in which the reception interval of "2.2 seconds" is stored as a reception interval candidate value. Furthermore, the detecting unit 28 reads, from the connection apparatus management table 23, the manufacturer code "CCC" and the product code "AirconC3" that are associated with the apparatus ID "C01". Then, the detecting unit 28 stores, in the created reception interval notification, the manufacturer code "CCC", the product code "AirconC3", the property name "setting temperature", the apparatus ID "C01", and the time zone of the time at which the reception interval notification has been created. Then, the detecting unit 28 outputs the reception interval notification to the server sending/receiving unit 29.

A description will be given here by referring back to FIG. 4. The server sending/receiving unit 29 sends and receives data to and from the control server 5 via the network 4. For example, when the server sending/receiving unit 29 receives a control instruction from the control server 5, the server sending/receiving unit 29 outputs the received control instruction to the apparatus sending/receiving unit 24. Furthermore, when the server sending/receiving unit 29 receives an acquisition request for a notification block timer value from the apparatus information acquiring unit 25, the server sending/receiving unit 29 sends the received acquisition request for the notification block timer value to the control server 5. Furthermore, when the server sending/receiving unit 29 receives a response to the acquisition request for the notification block timer value from the control server 5, the server sending/receiving unit 29 outputs the received response to the apparatus information acquiring unit 25.

Furthermore, when the server sending/receiving unit 29 receives a state change notification from the determining unit 27 or the distribution unit 26, the server sending/receiving unit 29 sends the received state change notification to the control server 5 via the network 4. Furthermore, when the server sending/receiving unit 29 receives a reception interval notification from the detecting unit 28, the server sending/receiving unit 29 sends the received reception interval notification to the control server 5 via the network 4. Furthermore, when the server sending/receiving unit 29 receives update data that is apparatus information updated by the control server 5, the server sending/receiving unit 29 outputs the received update data to the apparatus information acquiring unit 25.

From among the units described above in the functional configuration, the determining unit 27 is an example of a determining unit described in the CLAIMS; the server sending/receiving unit 29 is an example of a sending unit described in the CLAIMS; and the detecting unit 28 is an example of a calculating unit and a candidate notifying unit described in the CLAIMS. Furthermore, the connection apparatus management table 23 is an example of a standby time storing unit described in the CLAIMS; the reception history table 21 is an example of a history storing unit described in the CLAIMS; and the state change notification temporary saving table 22 is an example of a predetermined storage device described in the CLAIMS.

Figure 9:
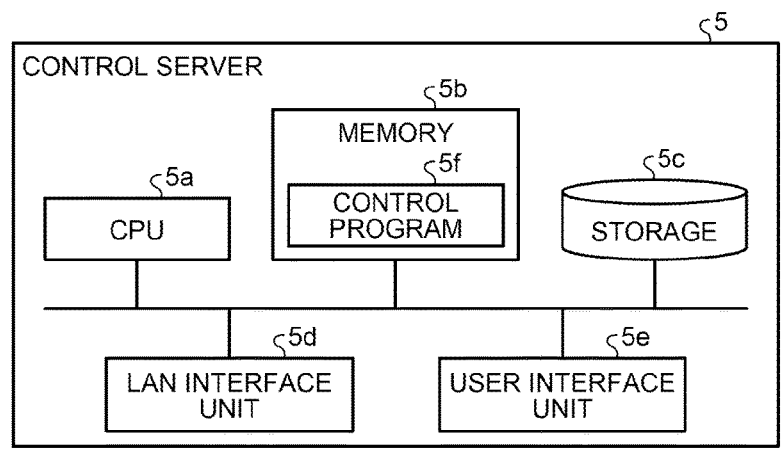
FIG. 9 is a schematic diagram illustrating an example of the configuration of hardware in a control server according to the first embodiment.

In the following, a description will be given of a specific example of the control server 5 illustrated in FIG. 1. First, an example of the configuration of hardware included in the control server 5 will be described with reference to FIG. 9. FIG. 9 is a schematic diagram illustrating an example of the configuration of hardware in a control server according to the first embodiment. For example, the control server 5 includes a CPU 5a, a memory 5b, storage 5c, a LAN interface unit 5d, and a user interface unit 5e. Furthermore, the memory 5b stores therein a control program 5f.

The CPU 5a is an arithmetic processing unit that executes various kinds of arithmetic processing. For example, by executing the control program 5f stored in the memory 5b, the CPU 5a controls each of the apparatuses 11 to 13 and 15 to 17. Furthermore, the memory 5b is a semiconductor memory device, such as a DIMM, a flash memory, or the like, and stores therein data that is used by the CPU 5a for the arithmetic processing. The storage 5c is a storage device, such as an HDD, an SSD, or the like.

The LAN interface unit 5d is a communication interface that controls communication with the gateway device 10 in the home 2 or communication with the gateway device 14 in the home 3. For example, the LAN interface unit 5d sends and receives data to and from each of the gateway devices 10 and 14 via the network 4. Furthermore, the user interface unit 5e is a communication interface that sends and receives data to and from the user terminal 6.

Figure 10:
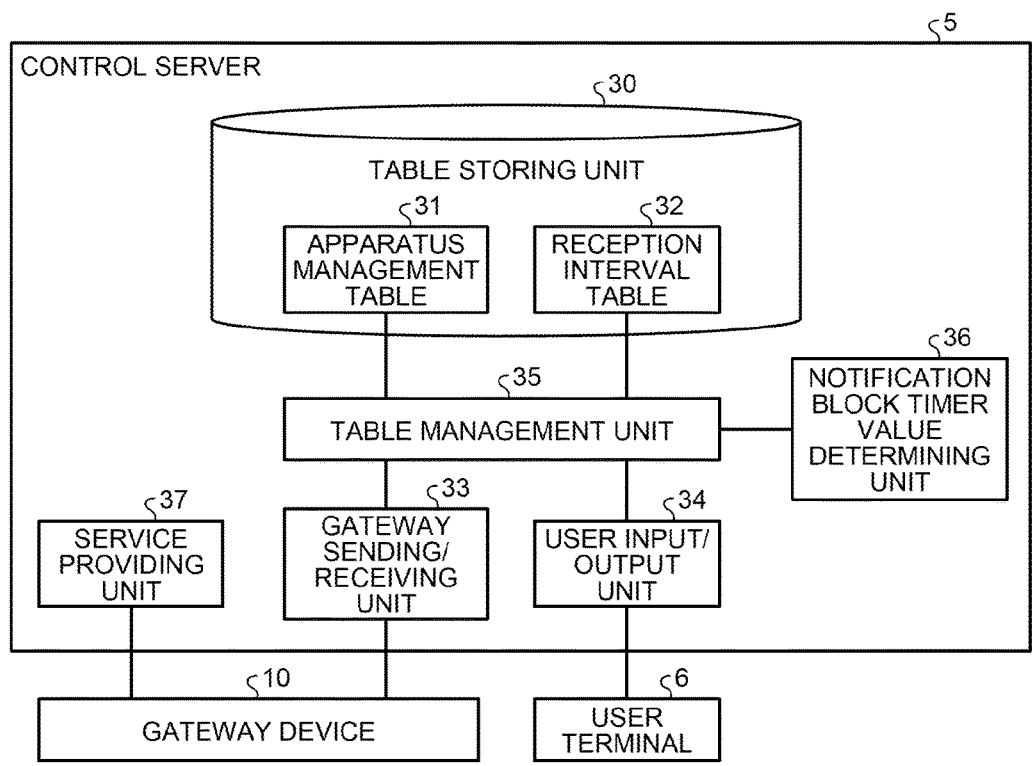
FIG. 10 is a schematic diagram illustrating a functional configuration of the control server according to the first embodiment.

Here, when the CPU 5a executes the control program 5f, the control server 5 is operated as a device having the functional configuration illustrated in FIG. 10. FIG. 10 is a schematic diagram illustrating the functional configuration of the control server according to the first embodiment. In the following, an example of the functional configuration of the control server 5 that executes the control program will be described with reference to FIG. 10.

In the example illustrated in FIG. 10, the control server 5 includes a table storing unit 30, a gateway sending/receiving unit 33, a user input/output unit 34, a table management unit 35, a notification block timer value determining unit 36, and a service providing unit 37. The table storing unit 30 stores therein an apparatus management table 31 and a reception interval table 32. Furthermore, the table storing unit 30 is, for example, a storage area that is set in the memory 5b.

In the following, first, a description will be given of information stored in the apparatus management table 31 and the reception interval table 32 in the table storing unit 30. The apparatus management table 31 stores therein management information that is used to manage the apparatuses 11 to 13 and 15 to 17 installed in the homes 2 and 3, respectively, in the control system 1.

For example, FIG. 11 is a schematic diagram illustrating an example of the apparatus management table 31. As illustrated in FIG. 11, the apparatus management table 31 stores therein, in an associated manner, the manufacturer code, the product code, the property name, the notification block timer value, the history acquisition flag, and the gateway ID (GWID). The GWID mentioned here is an identifier for a gateway device that relays communication from an apparatus that is indicated by the associated manufacturer code and the product code, i.e., a gateway device that is installed in the same home as that in which the apparatus indicated by the associated manufacturer code and the product code is installed.

For example, the example of the apparatus management table 31 illustrated in FIG. 11 indicates that the apparatus indicated by the manufacturer code of "AAA" and the product code of "Light A1" is installed in the same home as that in which the gateway device indicated by the GWID of "GW#1" is installed. Furthermore, the apparatus management table 31 indicates that the apparatus indicated by the manufacturer code of "BBB" and the product code of "AirconB2" is installed in the same home as that in which the gateway device indicated by the GWID of "GW#1" is installed and is also installed in the same home as that in which the gateway device indicated by the GWID of "GW#2" is installed.

A description will be given here by referring back to FIG. 10. The reception interval table 32 stores therein the content of the reception interval notification sent from each of the gateway devices 10 and 14. For example, FIG. 12 is a schematic diagram illustrating an example of the reception interval table 32. In the example illustrated in FIG. 12, the reception interval table 32 stores therein, in an associated manner, the manufacturer code, the product code, the property name, the GWID, the apparatus ID, the date, the time zone, and the reception interval. The reception interval illustrated in FIG. 12 is the reception interval candidate value calculated by each of the gateway devices 10 and 14.

For example, when the control server 5 receives a reception interval notification from the gateway device 10, the control server 5 extracts, from the reception interval notification, the manufacturer code, the product code, the property name, the apparatus ID, the reception interval, and the time zone. Then, the control server 5 associates the GWID of the gateway device 10 and the date on which the reception interval notification is received with the various kinds of information extracted from the reception interval notification and then stores them in the reception interval table 32.

For example, the reception interval table 32 illustrated as an example in FIG. 12 stores therein, in an associated manner, the manufacturer code of "CCC", the product code of "AirconC3", the property name of "setting temperature", the GWID of "GW#1", and the apparatus ID of "C01". Furthermore, the reception interval table 32 stores therein, in an associated manner, the date of "2013/03/05", the time zone between "00:00 and 12:00", and the reception interval of "1.5 seconds".

Specifically, the reception interval table 32 indicates that the gateway device indicated by the GWID of "GW#1", e.g. the gateway device 10, has detected the reception interval of a state change notification about the apparatus that is indicated by the manufacturer code "CCC" and the product code "AirconC3". Furthermore, the reception interval table 32 indicates that the gateway device 10 has detected, in the time zone between "00:00 and 12:00", that the reception interval candidate value of the state change notification, in which the apparatus ID of "C01" and the property name of "setting temperature" is stored, is "1.5 seconds". Furthermore, the reception interval table 32 indicates that the reception interval notification that stores therein the above described content is received on the date of "2013/03/05".

A description will be given here by referring back to FIG. 10. The gateway sending/receiving unit 33 sends and receives data to and from each of the gateway devices 10 and 14. For example, when the gateway sending/receiving unit 33 receives, from the gateway device 10, an acquisition request for apparatus information or a reception interval notification, the gateway sending/receiving unit 33 outputs the received acquisition request or the reception interval notification to the table management unit 35. Furthermore, when the gateway sending/receiving unit 33 receives, from the table management unit 35, a response to the acquisition request for the apparatus information, the gateway sending/receiving unit 33 sends the received response to the gateway device 10.

The user input/output unit 34 is an interface that receives an operation from the user terminal 6. Specifically, when the user input/output unit 34 receives apparatus information to be registered in the apparatus management table 31 from the user terminal 6, the user input/output unit 34 outputs the received apparatus information to the table management unit 35. In other words, the user input/output unit 34 is an interface that is used when a notification block timer value is manually set by using the user terminal 6. For example, when the user input/output unit 34 receives, from the user terminal 6, apparatus information that stores therein the manufacturer code "AAA", the product code "LightA1", the property name "setting brightness", and the notification block timer value "1.2 seconds", the user input/output unit 34 outputs the apparatus information to the table management unit 35.

The table management unit 35 manages information stored in the apparatus management table 31 and the reception interval table 32 stored in the table storing unit 30. In the following, the process performed by the table management unit 35 will be specifically described. First, when the table management unit 35 receives apparatus information from the user input/output unit 34, the table management unit 35 stores the received apparatus information in the apparatus management table 31.

Furthermore, when the table management unit 35 receives an acquisition request for the notification block timer value from the gateway sending/receiving unit 33, the table management unit 35 extracts, from the received acquisition request for the notification block timer value, a combination of a manufacturer code and a product code. Then, the table management unit 35 determines whether a notification block timer value associated with the extracted combination of the manufacturer code and the product code is stored in the apparatus management table 31.

At this point, if the notification block timer value that is associated with the extracted combination of the manufacturer code and the product code is stored in the apparatus management table 31, the table management unit 35 performs the following process. First, the table management unit 35 extracts all of the entries that store therein a notification block timer value that is associated with the extracted combination of the manufacturer code and the product code. Then, the table management unit 35 adds, to the extracted entries, the GWID of the gateway device 10 that is the send source of the acquisition request.

Furthermore, the table management unit 35 creates a reply that stores therein the property name, the notification block timer value, and the history acquisition flag that are stored in each of the extracted entries and then outputs the created response to the gateway sending/receiving unit 33. Consequently, the apparatus information acquiring unit 25 in the gateway device 10 stores, in the connection apparatus management table 23, the property name, the notification block timer value, and the history acquisition flag that are stored in the response.

In contrast, if a notification block timer value associated with the extracted combination of the manufacturer code and the product code is not stored in the apparatus management table 31, the table management unit 35 outputs a response indicating that the target information is not present to the gateway sending/receiving unit 33. For example, the table management unit 35 searches the apparatus management table 31 for an entry that stores therein the extracted combination of the manufacturer code and the product code. If the notification block timer value is not stored in an entry, the table management unit 35 outputs, to the gateway sending/receiving unit 33, a response indicating that the target information is not present. Consequently, the apparatus information acquiring unit 25 in the gateway device 10 ends the process without storing the apparatus information in the connection apparatus management table 23.

For example, the table management unit 35 receives an acquisition request for apparatus information that stores therein the manufacturer code of "BBB" and the product code of "AirconB2". In such a case, the table management unit 35 extracts two entries in each of which the manufacturer code of "BBB" and the product code of "AirconB2" are stored from the apparatus management table 31 illustrated as an example in FIG. 11. Specifically, the table management unit 35 extracts, from among the entries illustrated in FIG. 11, the second and the third entries from the top. Then, the table management unit 35 adds, to the GWID stored in each of the extracted entries, the GWID of, for example, "GW#4" of the gateway device that is the send source of the acquisition request.

Furthermore, the table management unit 35 creates a response that stores therein the property name "setting temperature", the notification block timer value "2.5 seconds", and the history acquisition flag "1" indicated by the second entry from the top. Furthermore, the table management unit 35 creates a response that stores therein the property name "setting airflow volume", the notification block timer value "1.5 seconds", and the history acquisition flag "0" indicated by the third entry from the top. Then, the table management unit 35 outputs the created two responses to the gateway sending/receiving unit 33 and instructs to send the responses to the gateway device that is the send source of the acquisition request.

Specifically, the table management unit 35 notifies, by using the apparatus management table 31, the gateway devices 10 and 14 in the homes 2 and 3, respectively, the same notification block timer value for each combination of the manufacturer code, the product code, and the property name. Consequently, the table management unit 35 can easily unify, without setting the gateway devices 10 and 14, the standby time for the gateway devices 10 and 14 for each combination of the apparatus ID and the property name, i.e., the setting of a notification block timer value.

Furthermore, when the table management unit 35 receives a reception interval notification from the gateway sending/receiving unit 33, the table management unit 35 stores, in an associated manner in the reception interval table 32, the received reception interval notification, the GWID of the gateway that is the send source of the reception interval notification, and the date on which the reception interval notification was received. For example, the table management unit 35 receives the reception interval notification that stores therein the manufacturer code of "CCC", the product code of "AirconC3", the property name of "setting temperature", the apparatus ID of "C01", the time zone between "00:00 and 12:00", and the reception interval of "1.5 seconds". In such a case, the table management unit 35 associates the reception interval notification with the date "2013/03/05" on which reception interval notification was received, the GWID of "GW#1" of the gateway device that is the send source of the reception interval notification and then stores the reception interval notification in the reception interval table 32.

Furthermore, in response to the request from the notification block timer value determining unit 36, the table management unit 35 outputs the reception interval table 32 to the notification block timer value determining unit 36. Furthermore, in response to the request from the notification block timer value determining unit 36, the table management unit 35 updates the apparatus management table 31. Furthermore, in response to the request from the notification block timer value determining unit 36, when the table management unit 35 updates the apparatus information, the table management unit 35 sends update data that is the updated apparatus information to the gateway device in the same home as that in which the apparatus according to the updated apparatus information is installed.

For example, the table management unit 35 receives an update instruction that stores therein the manufacturer code of "BBB", the product code of "AirconB2", the property name of "setting airflow volume", the notification block timer value of "1.5 seconds", and the history update flag of "0".

In such a case, the table management unit 35 extracts, from the apparatus management table 31 illustrated in FIG. 11, the entry that stores therein the manufacturer code of "BBB", the product code of "AirconB2", and the property name of "setting airflow volume". Specifically, the table management unit 35 extracts the third entry from the top from among the entries illustrated in FIG. 11. Then, the table management unit 35 updates the notification block timer value in the extracted entry to "1.5 seconds" and updates the history update flag in the extracted entry to "0".

Furthermore, the table management unit 35 identifies the GWID "GW#3" stored in the extracted entry. Then, the table management unit 35 creates update data that stores therein each piece of the information stored in the update request, outputs the created update data to the gateway sending/receiving unit 33, and instructs to send the update data to the gateway device that is indicated by the identified GWID "GW#3". Furthermore, the table management unit 35 deletes the entry that stores therein the manufacturer code of "BBB", the product code of "AirconB2", and the property name of "setting airflow volume" from the reception interval table 32.

A description will be given here by referring back to FIG. 10. By using the reception interval measured by each of the gateway devices 10 and 14, the notification block timer value determining unit 36 decides, for each combination of the apparatus and the property, a value for the notification block timer that is optimum in the overall of the control system 1. Specifically, the notification block timer value determining unit 36 acquires the reception interval table 32, for example, every two days via the table management unit 35.

Furthermore, the notification block timer value determining unit 36 performs, from the acquired reception interval table 32, the following process for each combination of the manufacturer code, the product code, and the property name. First, the notification block timer value determining unit 36 extracts, from the reception interval table 32, an entry in which a combination of the manufacturer code, the product code, and the property name that are targeted for the process. Then, the notification block timer value determining unit 36 calculates the average value of "Tawe" of the reception intervals included in the extracted entries and the standard deviation of "S".

Then, the notification block timer value determining unit 36 determines whether each of the reception intervals of "Tn" included in each of the extracted entries satisfies "Tave−3S≤Tn≤Tave+3S". Then, from among the reception intervals of "Tn" that satisfy "Tave−3S≤Tn≤Tave+3S", the notification block timer value determining unit 36 sets the reception interval having the maximum value as the reception interval representative value "T". Subsequently, the notification block timer value determining unit 36 sets the value with a 10% increase in the reception interval representative value "T" as a new notification block timer value.

Then, the notification block timer value determining unit 36 instructs the table management unit 35 to update the notification block timer value that is associated with the manufacturer code, the product code, and the property name targeted for the process to a new notification block timer value. Specifically, the notification block timer value determining unit 36 outputs, to the table management unit 35, an update request that stores therein a combination of the manufacturer code, the product code, and the property name, which are targeted for the process, the new notification block timer value, and the history acquisition flag "0".

Figure 13:
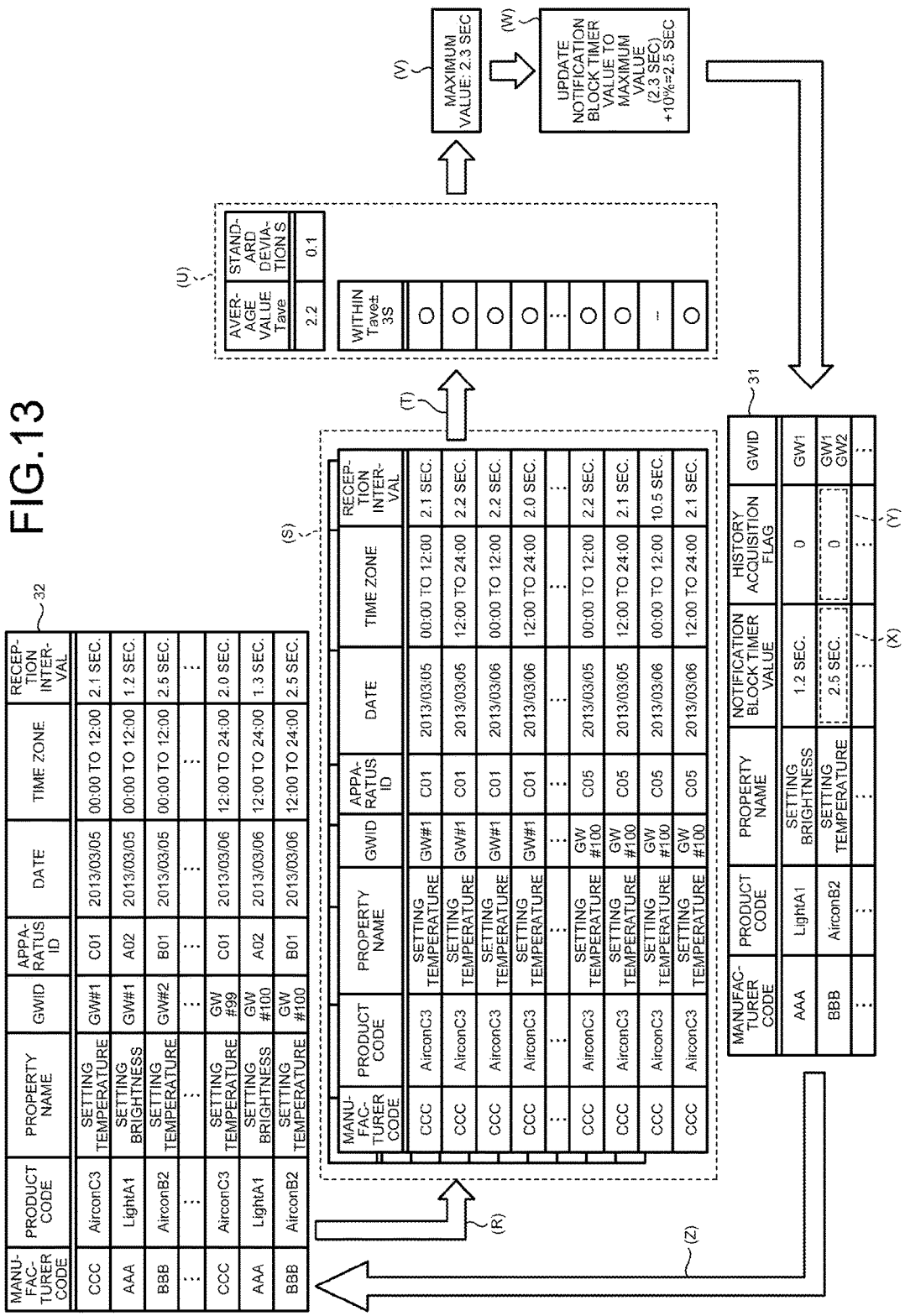
FIG. 13 is a schematic diagram illustrating an example of a process that updates a notification block timer by using reception intervals.

In the following, a specific example of a process performed by the notification block timer value determining unit 36 will be described with reference to FIG. 13. FIG. 13 is a schematic diagram illustrating an example of a process that updates a notification block timer by using reception intervals. First, as illustrated by (R) in FIG. 13, the notification block timer value determining unit 36 extracts, from the reception interval table 32, entries for the combinations of the manufacturer code, the product code, and the property name. For example, as illustrated by (S) in FIG. 13, the notification block timer value determining unit 36 extracts entries each of which stores therein the manufacturer code "CCC", the product code "AirconC3", and the property name "setting temperature". Consequently, the notification block timer value determining unit 36 extracts, for the same type of apparatuses installed in each home in the control system 1, the reception intervals of the state change notifications when the continuous operations are performed.

Then, as illustrated by (T) in FIG. 13, the notification block timer value determining unit 36 calculates, from the reception intervals of the extracted entries, the average value of "Tawe" and the standard deviation of "S" and obtains the average value, i.e., "Tave=2.2", and the standard deviation, i.e., "S=0.1". Consequently, as illustrated by (U) in FIG. 13, the notification block timer value determining unit 36 determines whether the reception interval value of each of the extracted entries is within the range of "1.9≤Tn≤2.5". In the example illustrated in FIG. 13, a circle is added to each of the entries in which the reception interval value is within the range of "1.9≤Tn≤2.5".

Furthermore, as illustrated by (V) in FIG. 13, the notification block timer value determining unit 36 acquires the maximum value "2.3" of the reception interval stored in the entry in which the reception interval value is within the range of "1.9≤Tn≤2.5". Then, as illustrated by (W) in FIG. 13, the notification block timer value determining unit 36 sets the value "2.5" that is a 10% increase in the maximum value "2.3" as the new notification block timer value.

Consequently, the table management unit 35 extracts, from each of the entries in the apparatus management table 31, entries in each of which the manufacturer code "CCC", the product code "AirconC3", and the property name "setting temperature" are stored. Then, as illustrated by (X) in FIG. 13, the table management unit 35 updates the notification block timer value in each of the extracted entries to "2.5 seconds" and updates, as illustrated by (Y) in FIG. 13, the history acquisition flag to "0". Then, as illustrated by (Z) in FIG. 13, the table management unit 35 deletes, from the reception interval table 32, the entries in each of which the manufacturer code "CCC", the product code "AirconC3", and the property name "setting temperature" are stored.

As described above, for the combination of the property name and the apparatus in which a notification block timer value is not set, the notification block timer value determining unit 36 calculates a notification block timer value in accordance with the reception interval value of the state change notification. Consequently, the table management unit 35 can notify the gateway devices 10 and 14 in the homes 2 and 3, respectively, of the notification block timer value that is calculated by the notification block timer value determining unit 36.

A description will be given here by referring back to FIG. 10. The service providing unit 37 controls each of the apparatuses 11 to 13 and 15 to 17 in accordance with the content of a state change notification received from each of the gateway devices 10 and 14. For example, when the service providing unit 37 receives a state change notification about the setting brightness of the lighting apparatus 12, the service providing unit 37 extracts a value of the setting brightness from the received state change notification. Then, the service providing unit 37 sends, to the gateway device 10, a control instruction that is addressed to the lighting apparatus 13 and that indicates that the setting brightness is changed to the extracted value. Consequently, the lighting apparatus 13 changes the brightness to the same setting brightness as that set to the lighting apparatus 12. Furthermore, the service providing unit 37 can provide an arbitrary service in addition to the content described above.

In the functional configuration described above, the notification block timer value determining unit 36 is an example of a deciding unit described in the CLAIMS and the gateway sending/receiving unit 33 is an example of a notifying unit described in the CLAIMS. Furthermore, the service providing unit 37 is an example of a control unit described in the CLAIMS.

Figure 15:
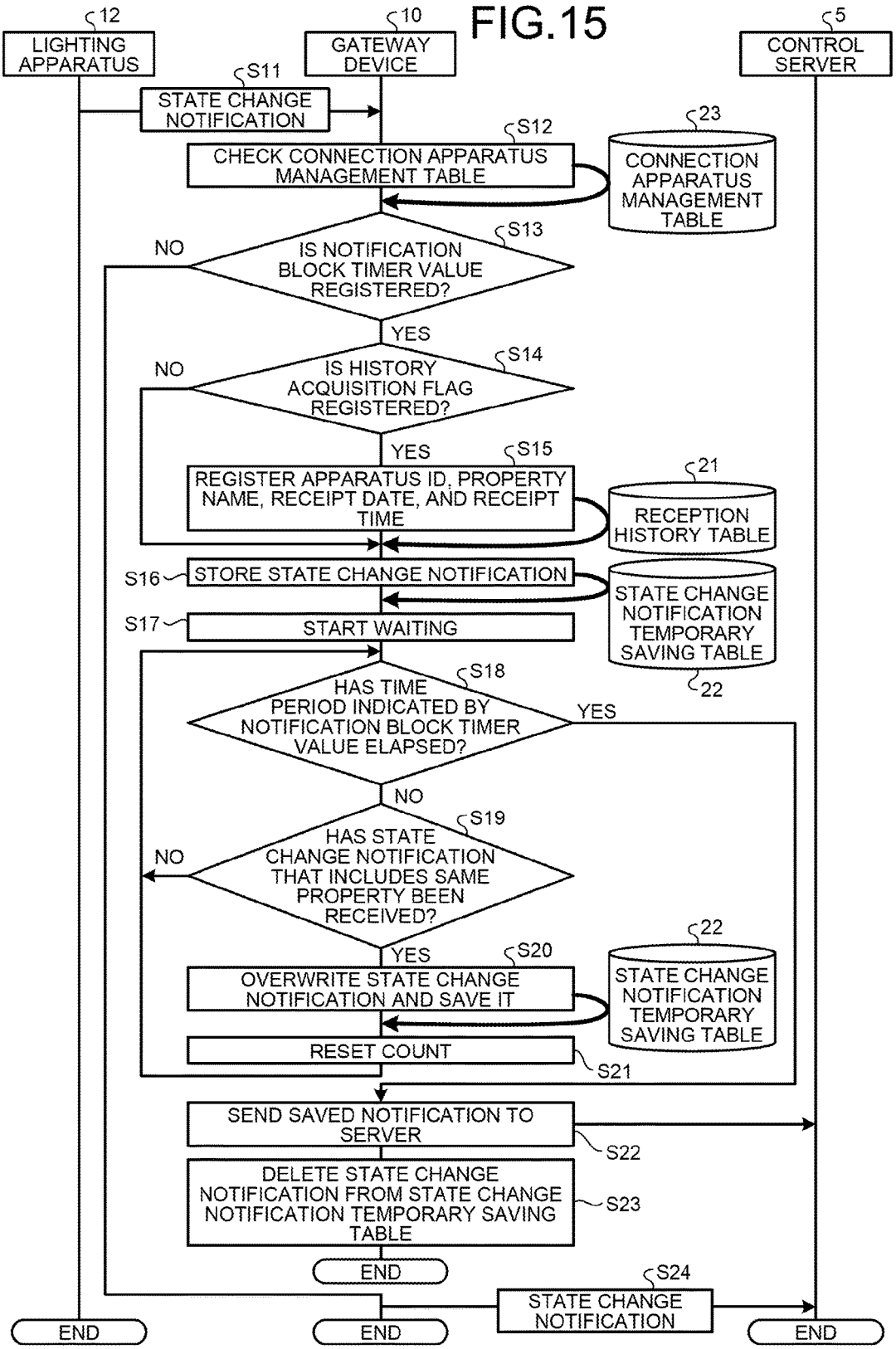
FIG. 15 is a sequence diagram illustrating a process performed when a state change notification is received.
Figure 16:
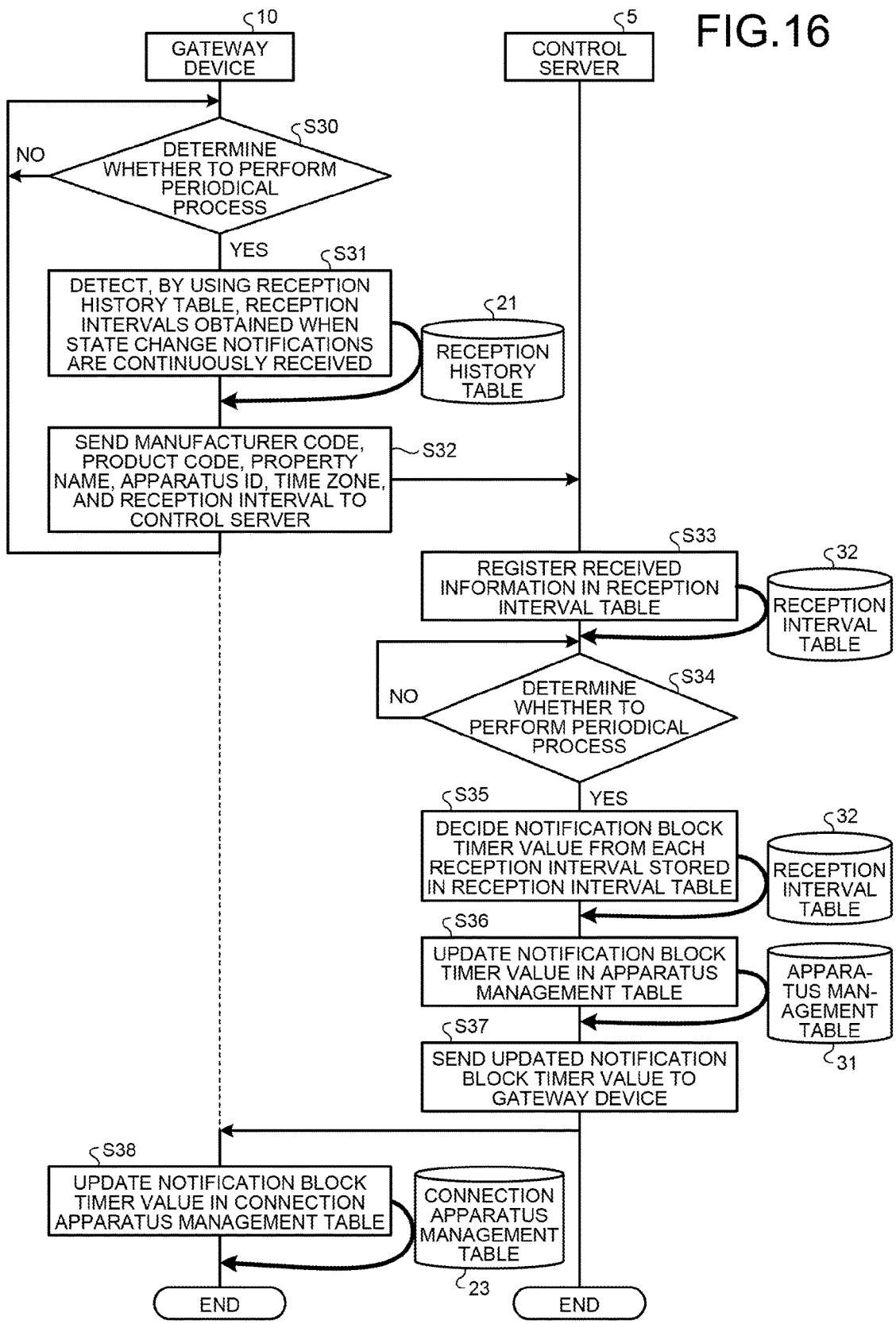
FIG. 16 is a sequence diagram illustrating a process that updates the apparatus management table.

In the following, processes performed by the gateway device 10 and the control server 5 will be described with reference to FIGS. 14 to 16. First, the flow of the process performed by the gateway device 10 and the control server 5 when the newly installed lighting apparatus 12 is detected will be described with reference to FIG. 14.

Figure 14:
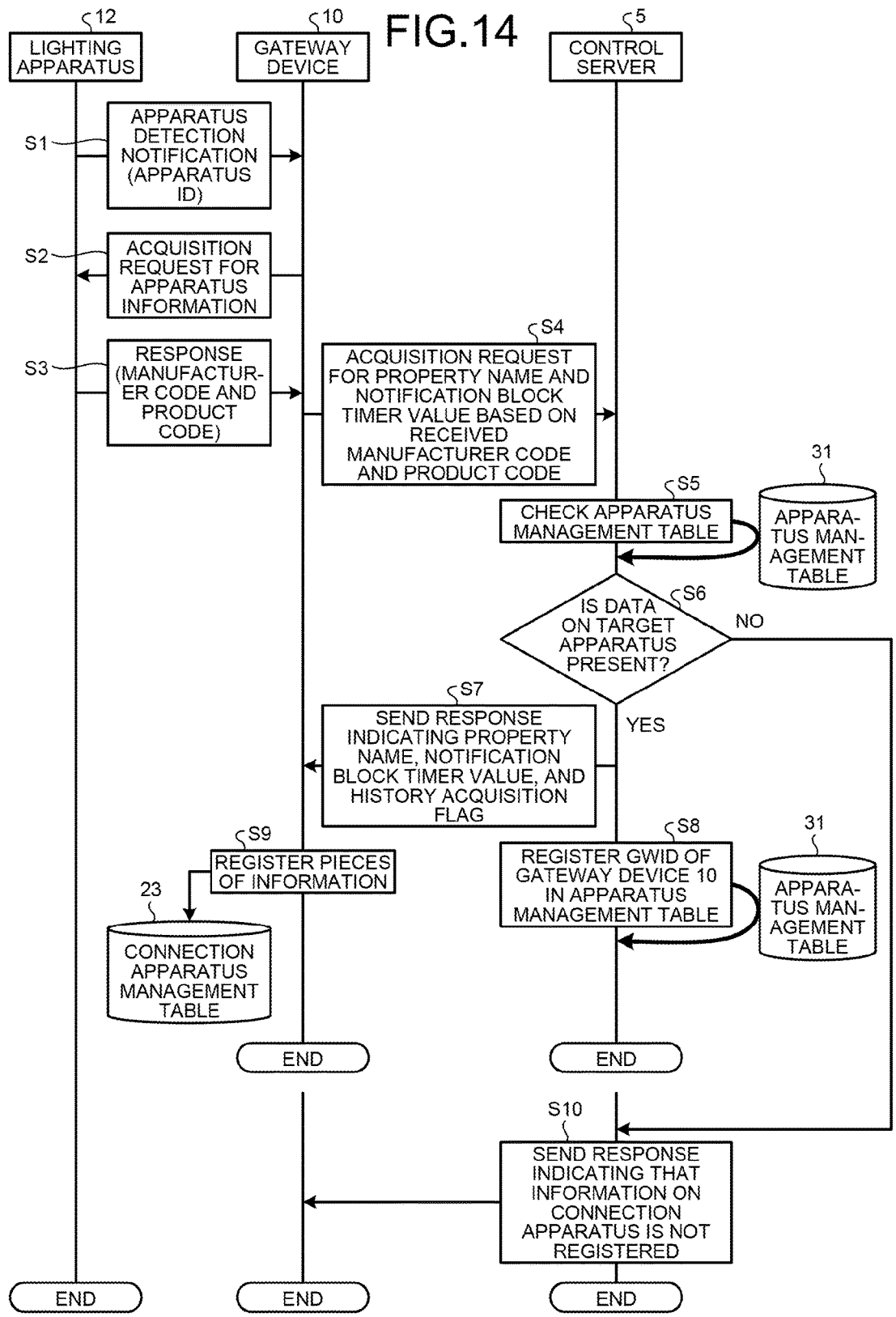
FIG. 14 is a sequence diagram illustrating a process performed when an apparatus is detected.

FIG. 14 is a sequence diagram illustrating a process performed when an apparatus is detected. First, the lighting apparatus 12 sends an apparatus detection notification that includes therein the apparatus ID to the gateway device 10 (Step S1). The gateway device 10 sends an acquisition request for the manufacturer code and the product code to the lighting apparatus 12 (Step S2). Consequently, the lighting apparatus 12 sends, to the gateway device 10, a response that includes the manufacturer code and the product code (Step S3).

Then, on the basis of the received manufacturer code and the product code, the gateway device 10 sends an acquisition request for the property name and the notification block timer value to the control server 5 (Step S4). Consequently, the control server 5 checks the apparatus management table 31 (Step S5) and determines whether data on the target apparatus is present (Step S6). Specifically, the control server 5 determines whether a notification block timer value that is associated with the combination of the manufacturer code and the product code received from the gateway device 10 is stored in the apparatus management table 31.

If the control server 5 determines that the data on the target apparatus is present (Yes at Step S6), the control server 5 performs the following process. First, the control server 5 sends, to the gateway device 10, a response that includes therein the property name and the notification block timer value, which are associated with the received combination of the manufacturer code and the product code, and the history acquisition flag (Step S7). Then, the control server 5 stores the GWID of the gateway device 10 in the apparatus management table 31 (Step S8) and then ends the process.

When the gateway device 10 receives the response that includes therein the property name, the notification block timer value, and the history acquisition flag, the gateway device 10 stores the received information in the connection apparatus management table 23 (Step S9) and ends the process. In contrast, when the control server 5 determines that the data on the target apparatus is not present (No at Step S6), the control server 5 sends, to the gateway device, a response indicating that information on the target apparatus is not registered (Step S10) and then ends the process.

In the following, the process performed when the gateway device 10 receives a state change notification will be described with reference to FIG. 15. FIG. 15 is a sequence diagram illustrating a process performed when a state change notification is received. For example, if the setting, such as the setting brightness or the like, has been changed, the lighting apparatus 12 sends, to the gateway device 10, a state change notification that includes therein the apparatus ID, the property name, and the changed value (Step S11). The gateway device 10 checks the connection apparatus management table 23 (Step S12) and determines whether the notification block timer value that is associated with the combination of the apparatus ID and the property name in the received state change notification is registered (Step S13).

If the notification block timer value that is associated with the combination of the apparatus ID and the property name in the received state change notification is registered (Yes at Step S13), the gateway device 10 performs the following process. First, the gateway device 10 determines whether the history acquisition flag is registered by being associated with the combination of the apparatus ID and the property name that are included in the received state change notification (Step S14).

If the history acquisition flag is registered by being associated with the combination of the apparatus ID and the property name (Yes at Step S14), the gateway device 10 registers the apparatus ID, the property name, the receipt date, and the receipt time in the reception history table 21 (Step S15). In contrast, if the history acquisition flag is not registered by being associated with the combination of the apparatus ID and the property name (No at Step S14), the gateway device 10 skips the process at Step S15.

Furthermore, the gateway device 10 stores the state change notification in the state change notification temporary saving table 22 (Step S16). Then, the gateway device 10 starts to wait for the time period indicated by the notification block timer value that is associated with the combination of the apparatus ID and the property name that are included in the received state change notification (Step S17). Furthermore, the gateway device 10 determines whether the time period indicated by the notification block timer value has elapsed (Step S18). If the time period indicated by the notification block timer value has not elapsed (No at Step S18), the gateway device 10 performs the following process.

First, the gateway device 10 determines whether a state change notification that includes the same property has been received from the same apparatus (Step S19). If a state change notification that includes the same property has been received from the same apparatus (Yes at Step S19), the gateway device 10 overwrites the state change notification stored in the state change notification temporary saving table 22 with a newly received state change notification and then save the state change notification (Step S20). Then, the gateway device 10 resets the count of the notification block timer value (Step S21) and performs the process at Step S18 again. In contrast, if the gateway device 10 does not receive a state change notification that includes the same property from the same apparatus (No at Step S19), the gateway device 10 performs the process at Step S18 again.

Furthermore, if the time period indicated by the notification block timer value has elapsed (Yes at Step S18), the gateway device 10 sends the notification stored in the state change notification temporary saving table 22 to the control server 5 (Step S22). Furthermore, the gateway device 10 deletes the state change notification from the state change notification temporary saving table 22 (Step S23) and then ends the process. If the notification block timer value that is associated with the combination of the apparatus ID and the property name, which are included in the received state change notification, is not registered (No at Step S13), the gateway device 10 sends a state change notification to the control server 5 (Step S24) and then ends the process.

In the following, a process performed when the connection apparatus management table 23 in the gateway device 10 and the apparatus management table 31 in the control server 5 are updated will be described with reference to FIG. 16. FIG. 16 is a sequence diagram illustrating a process that updates the apparatus management table. First, the gateway device 10 determines whether to perform a periodical process (Step S30). Specifically, the gateway device 10 determines whether 12 hours have elapsed since the gateway device 10 performed the previous processes at Steps S31 and S32.

Then, the gateway device 10 waits for, for example, 12 hours after the gateway device 10 performed the previous processes at Steps S31 and S32 (No at Step S30). If the gateway device 10 determines to perform the periodical process (Yes at Step S30), the gateway device 10 performs the following process. First, the gateway device 10 detects, by using the receipt time stored in the reception history table 21, the reception intervals obtained when state change notifications are continuously received (Step S31). Then, the gateway device 10 sends the manufacturer code, the product code, the property name, the apparatus ID, the time zone, and the reception interval to the control server 5 (Step S32).

In contrast, the control server 5 stores the various kinds of information received from the gateway device 10 in the reception interval table 32 (Step S33). Then, the control server 5 determines whether to perform the periodical process (Step S34). For example, the control server 5 determines whether two months have elapsed since the previous processes at Steps S35, S36, and S37 were performed. If the control server 5 determines that two months have elapsed since the previous processes at Steps S35, S36, and S37 were performed and determines to perform the periodical process (Yes at Step S34), the control server 5 performs the following process.

First, the control server 5 decides a notification block timer value from each of the reception intervals stored in the reception interval table 32 (Step S35). Then, the control server 5 updates the notification block timer value stored in the apparatus management table 31 (Step S36). Furthermore, the control server 5 sends a new notification block timer value to the gateway device that is installed in the same home as that in which an apparatus having the updated notification block timer value is installed (Step S37) and then ends the process. In contrast, when the gateway device 10 receives a new notification block timer value, the gateway device 10 updates the notification block timer value stored in the connection apparatus management table 23 (Step S38) and then ends the process.

Figure 17:
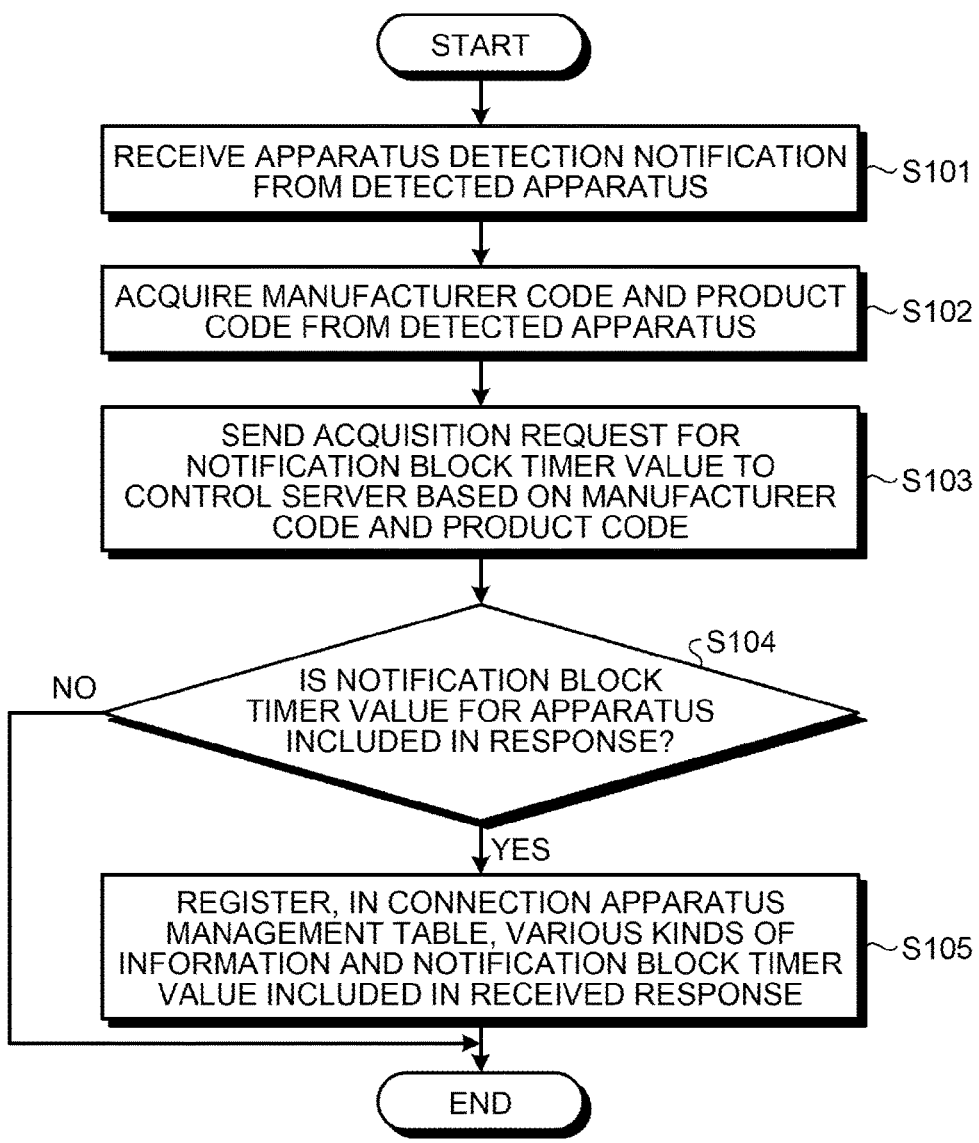
FIG. 17 is a flowchart illustrating a flow of a process performed when the gateway device according to the first embodiment detects a new apparatus.

In the following, the flow of a process performed by the gateway device 10 when the gateway device 10 detects a new apparatus will be described with reference to FIG. 17. FIG. 17 is a flowchart illustrating the flow of a process performed when the gateway device according to the first embodiment detects a new apparatus. The processes performed at Steps S101 to S105 illustrated in FIG. 17 are performed by the gateway device 10 when the processes illustrated in FIG. 14 are performed.

First, the gateway device 10 receives an apparatus detection notification from the detected apparatus (Step S101). Then, the gateway device 10 acquires the manufacturer code and the product code from the detected apparatus (Step S102). Furthermore, on the basis of the acquired manufacturer code and the product code, the gateway device 10 sends an acquisition request for a notification block timer value to the control server 5 (Step S103). When the gateway device 10 receives a response, the gateway device 10 determines whether a notification block timer value for the apparatus is included in the received response (Step S104).

At this point, if a notification block timer value for the apparatus is included in the received response (Yes at Step S104), the gateway device 10 stores, in the connection apparatus management table 23, various kinds of information and the notification block timer value included in the received response (Step S105) and then ends the process. In contrast, if a notification block timer value for the apparatus is not included in the received response (No at Step S104), the gateway device 10 ends the process without processing anything.

Figure 18:
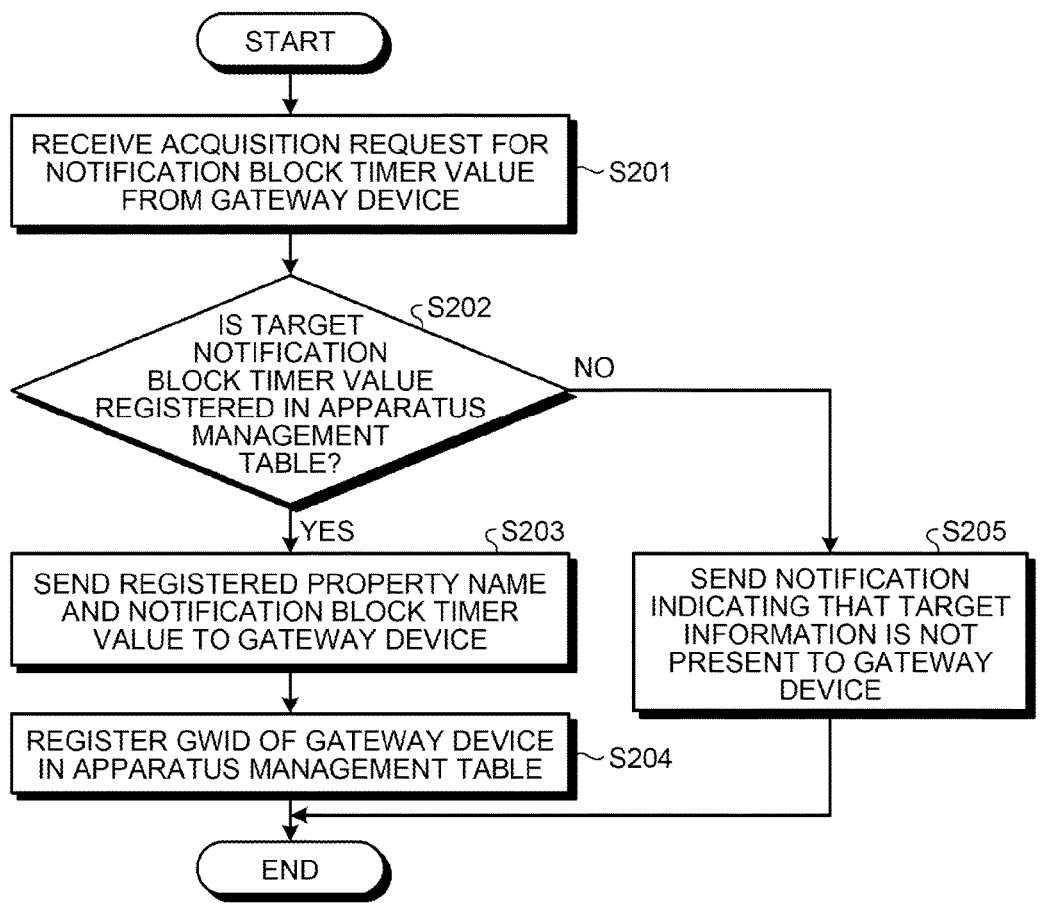
FIG. 18 is a flowchart illustrating a flow of a process performed when the control server according to the first embodiment receives an acquisition request for a notification block timer value.

In the following, the flow of a process performed by the control server 5 when the control server 5 receives an acquisition request for a notification block timer value will be described with reference to FIG. 18. FIG. 18 is a flowchart illustrating the flow of a process performed when the control server according to the first embodiment receives an acquisition request for a notification block timer value. The processes performed at Steps S201 to S205 illustrated in FIG. 18 are performed by the control server 5 when the processes illustrated in FIG. 14 are performed.

First, the control server 5 receives an acquisition request for a notification block timer value from the gateway device 10 (Step S201). Then, the control server 5 determines whether the target notification block timer value is stored in the apparatus management table 31 (Step S202). Specifically, the control server 5 determines whether the notification block timer value that is associated with the manufacturer code and the product code, which are stored in the acquisition request for the notification block timer value, is registered in the apparatus management table 31.

If the target notification block timer value is registered in the apparatus management table 31 (Yes at Step S202), the control server 5 sends the target notification block timer value and the associated property name to the gateway device 10 (Step S203). At this point, if multiple associated notification block timer values are registered in the apparatus management table 31, the control server 5 sends, to the gateway device 10, each combination of the notification block timer value and the property name.

Then, the control server 5 stores the GWID of the gateway device 10 in the apparatus management table (Step S204) and then ends the process. In contrast, if the target notification block timer value is not registered in the apparatus management table 31 (No at Step S202), the control server 5 sends a response indicating that the target information is not present to the gateway device 10 (Step S205) and then ends the process.

Figure 19:
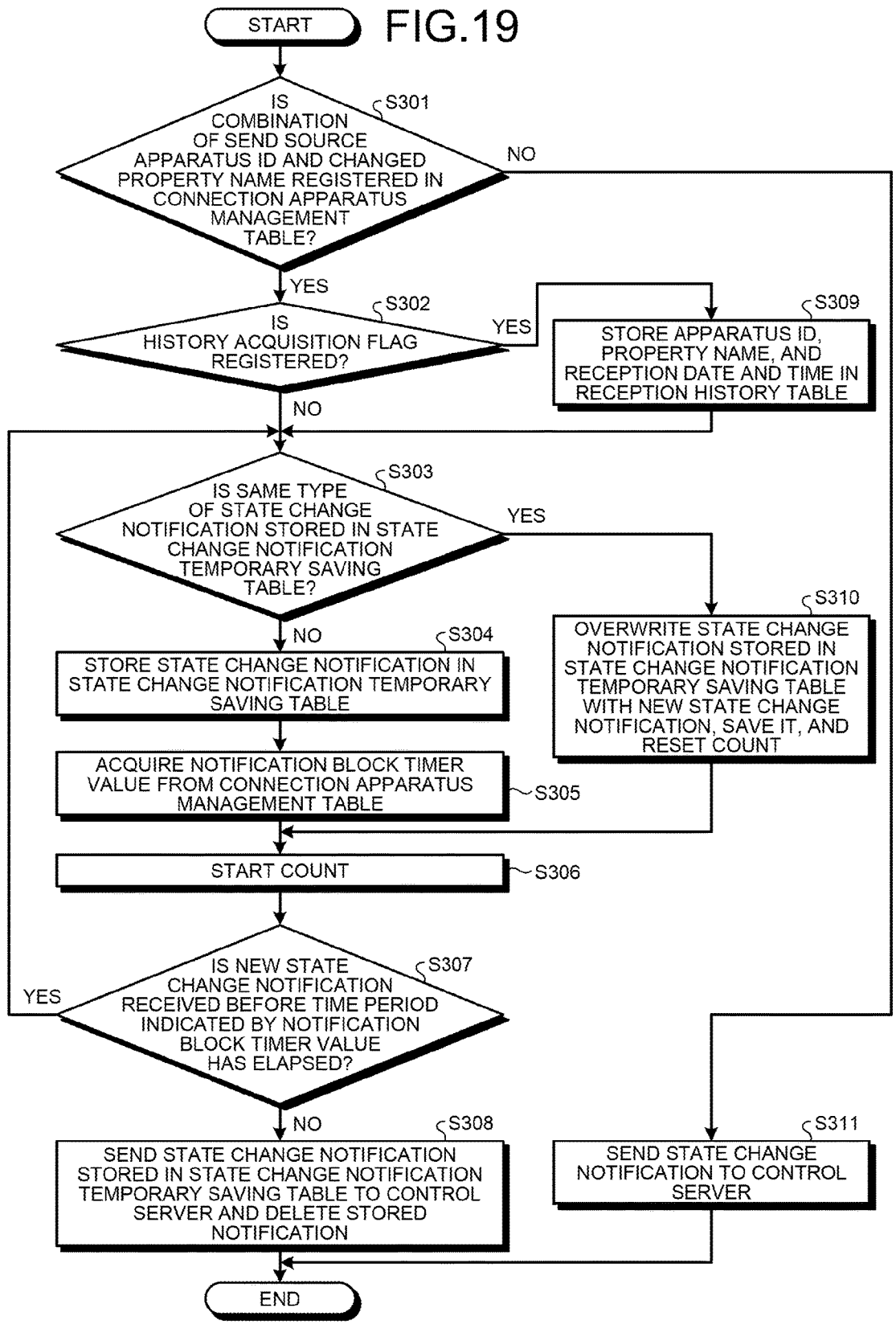
FIG. 19 is a flowchart illustrating a flow of a process performed when the gateway device according to the first embodiment receives a state change notification.

In the following, the flow of a process performed by the gateway device 10 when the gateway device 10 receives a state change notification will be described with reference to FIG. 19. FIG. 19 is a flowchart illustrating the flow of a process performed when the gateway device according to the first embodiment receives a state change notification. The processes performed at Steps S301 to S311 illustrated in FIG. 19 are performed by the gateway device 10 when the processes illustrated in FIG. 15 are performed.

First, when the gateway device 10 receives a state change notification, the gateway device 10 determines whether a combination of the apparatus ID, which is the send source of the state change notification, and the changed property name is registered in the connection apparatus management table 23 (Step S301). Specifically, the gateway device 10 determines whether a combination of the apparatus ID and the property name extracted from the received state change notification is registered in the connection apparatus management table 23. If a combination of the apparatus ID and the property name extracted from the received state change notification is registered in the connection apparatus management table 23 (Yes at Step S301), the gateway device 10 performs the following process. Namely, the gateway device 10 determines whether the history acquisition flag is registered in the connection apparatus management table 23 by being associated with the combination of the apparatus ID and the property name (Step S302).

If the history acquisition flag is not registered by being associated with the combination of the apparatus ID and the property name (No at Step S302), the gateway device 10 determines whether the same type of the state change notification is registered in the state change notification temporary saving table 22 (Step S303). Specifically, the gateway device 10 determines whether a state change notification that stores therein a combination of the extracted apparatus ID and the property name is stored in the state change notification temporary saving table 22. If the same type of the state change notification is not registered in the state change notification temporary saving table 22 (No at Step S303), the gateway device 10 stores the received state change notification in the state change notification temporary saving table 22 (Step S304).

Furthermore, the gateway device 10 acquires a notification block timer value that is associated with the combination of the extracted apparatus ID and the property name from the connection apparatus management table 23 (Step S305) and then starts the counting (Step S306). Then, the gateway device 10 determines whether a new state change notification is received before a time period indicated by the notification block timer value has elapsed (Step S307). If a new state change notification is not received before a time period indicated by the notification block timer value has elapsed (No at Step S307), the gateway device 10 performs the following process. Namely, the gateway device 10 sends the state change notification stored in the state change notification temporary saving table 22 to the control server 5, deletes the sent state change notification from the state change notification temporary saving table 22 (Step S308), and then ends the process.

Furthermore, if the history acquisition flag is registered by being associated with the combination of the extracted apparatus ID and the property name (Yes at Step S302), the gateway device 10 stores, in the reception history table 21, the extracted apparatus ID, the extracted property name, and the reception date and time (Step S309). Then, the gateway device 10 performs the process at Step S303. Furthermore, if the gateway device 10 receives a new state change notification before the time period indicated by the notification block timer value has elapsed (Yes at Step S307), the gateway device 10 performs the process at Step S303.

Furthermore, if the same type of the state change notification is stored in the state change notification temporary saving table 22 (Yes at Step S303), the gateway device 10 performs the following process. Specifically, the gateway device 10 overwrites the state change notification stored in the state change notification temporary saving table 22 with a new state change notification and resets the count (Step S310). Then, the gateway device 10 performs the process at Step S306.

Furthermore, if a combination of the apparatus ID and the property name extracted from the received state change notification is not registered in the connection apparatus management table 23 (No at Step S301), the gateway device 10 sends the received state change notification to the control server 5 (Step S311). Then, the gateway device 10 ends the process.

Figure 20:
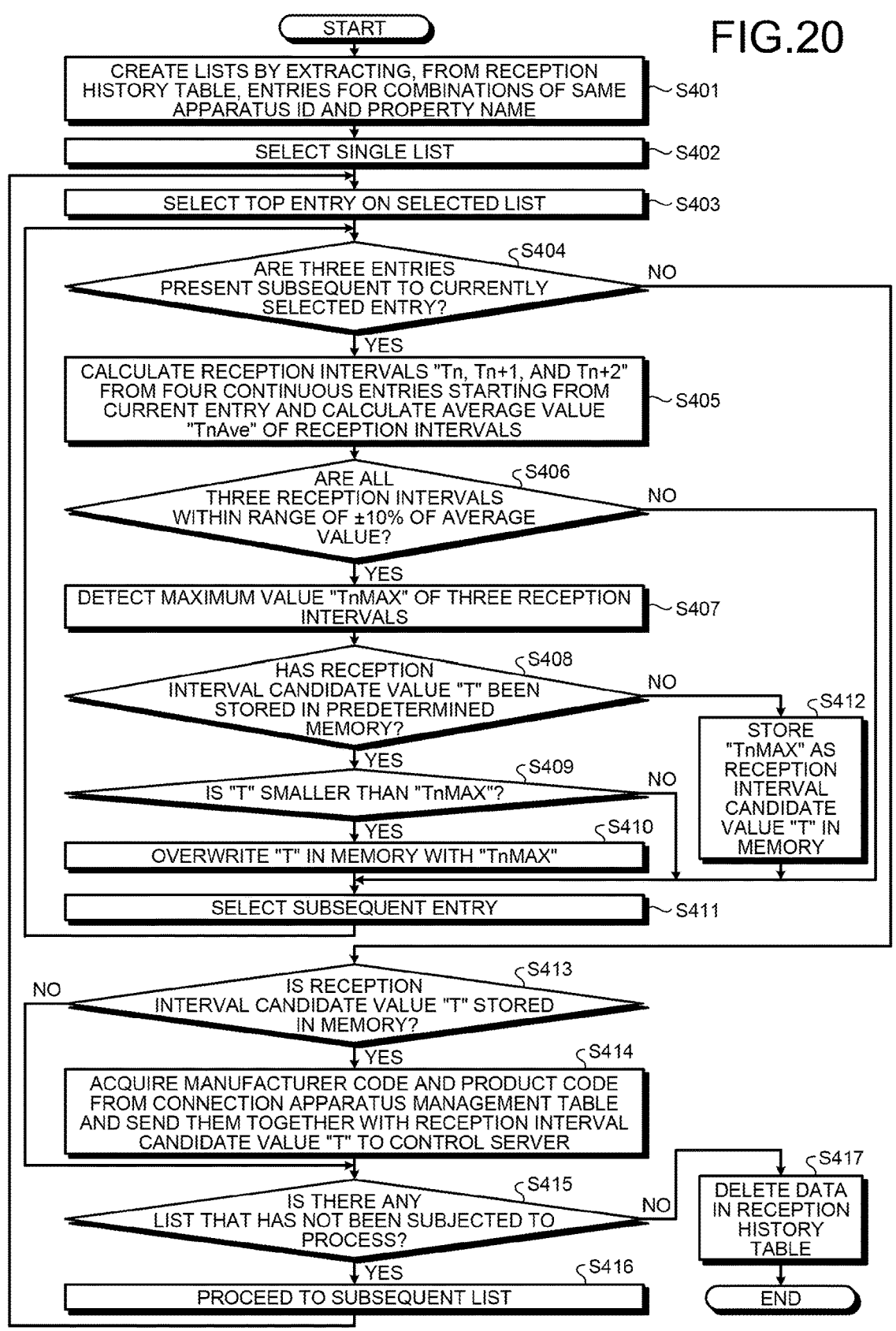
FIG. 20 is a flowchart illustrating a flow of a process in which the gateway device according to the first embodiment detects a reception interval.

In the following, the flow of a process in which the gateway device 10 detects a reception interval will be described with reference to FIG. 20. FIG. 20 is a flowchart illustrating the flow of a process in which the gateway device 10 according to the first embodiment detects a reception interval. The processes performed at Steps S401 to S417 illustrated in FIG. 20 are performed by the gateway device 10 when the processes illustrated in FIG. 16 are performed.

First, the gateway device 10 creates lists by extracting, from the reception history table 21, the receipt time for combinations of the same apparatus ID and the property name (Step S401). Then, the gateway device 10 selects a single list (Step S402). Then, the gateway device 10 selects the top entry on the selected list (Step S403).

Subsequently, the gateway device 10 determines whether three entries are present subsequent to the currently selected entry (Step S404). If three entries are present subsequent to the currently selected entry (Yes at Step S404), the gateway device 10 performs the following process. Namely, the gateway device 10 calculates the reception intervals "Tn, Tn+1, and Tn+2" and the average value "TnAve" of the reception intervals from the receipt time stored in each of the four continuous entries starting from the currently selected entry (Step S405).

Then, the gateway device 10 determines whether the three reception intervals "Tn, Tn+1, and Tn+2" are within the range of ±10% of the average value "TnAve" (Step S406). Specifically, the gateway device 10 determines whether the three reception intervals "Tn, Tn+1, and Tn+2" satisfy "TnAvex0.9≤Tn, Tn+1, and Tn+2≤TnAvex1.1", respectively. If the three reception intervals "Tn, Tn+1, and Tn+2" are within the range of ±10% of the average value "TnAve" (Yes at Step S406), the gateway device 10 detects the maximum value "TnMAX" of the three reception intervals (Step S407).

Then, the gateway device 10 determines whether the reception interval candidate value "T" has been stored in a predetermined memory (Step S408). If the reception interval candidate value "T" is stored (Yes at Step S408), the gateway device 10 determines whether "T" is smaller than "TnMAX" (Step S409). If "T" is smaller than "TnMAX" (Yes at Step S409), the gateway device 10 overwrites "T" in the memory with "TnMAX" (Step S410), selects the subsequent entry (Step S411), and then performs the process at Step S404.

In contrast, if "T" is greater than "TnMAX" (No at Step S409), the gateway device 10 skips the process at Step S410. Furthermore, if the reception interval candidate value "T" is not stored (No at Step S408), the gateway device 10 stores "TnMAX" as the reception interval candidate value "T" in a predetermined memory (Step S412) and then performs the process at Step S411. Furthermore, if the three reception intervals "Tn, Tn+1, and Tn+2" are not within the range of ±10% of the average value "TnAve" (No at Step S406), the gateway device 10 skips the three processes at Steps S407 to S410 and performs the process at Step S411.

Furthermore, if three entries are not present after the currently selected entry (No at Step S404), the gateway device 10 determines whether the reception interval candidate value "T" is stored in a predetermined memory (Step S413). If the reception interval candidate value "T" is stored in the predetermined memory (Yes at Step S413), the gateway device 10 performs the following process. First, the gateway device 10 acquires, from the connection apparatus management table 23, the manufacturer code and the product code of the target apparatus, i.e., the manufacturer code and the product code that are associated with the combination of the apparatus ID and the property name used for the process at Step S402. Then, the gateway device 10 sends the reception interval candidate value "T", the acquired manufacturer code, and the acquired product code to the control server 5 (Step S414).

Furthermore, the gateway device 10 determines whether a list that has not been subjected to process, i.e., a list of the combination of the same apparatus ID and the property name created at Step S401, is present (Step S415). If a list that has not been subjected to process is present (Yes at Step S415), the gateway device 10 proceeds to the subsequent list (Step S416) and performs the process at Step S403. In contrast, a list that has not been subjected to process is not present (No at Step S415), the gateway device 10 deletes the data in the reception history table 21 (Step S417) and ends the process. If the reception interval candidate value "T" is not stored in the predetermined memory (No at Step S413), the gateway device 10 skips the process at Step S414.

In the following, the flow of the process in which the control server 5 determines a notification block timer value will be described with reference to FIG. 21. FIG. 21 is a flowchart illustrating the flow of a process in which the control server according to the first embodiment determines a notification block timer value. The processes performed at Steps S501 to S514 illustrated in FIG. 21 are performed by the control server 5 when the processes illustrated in FIG. 16 are performed.

First, the control server 5 creates lists by extracting, from the reception interval table 32, entries for combinations of the manufacturer code, the product code, and the property name (Step S501). Then, the control server 5 selects a single list (Step S502). Then, the control server 5 calculates, from the reception interval value included in each of the entries in the selected list, the average value "Tawe" and the standard deviation "S" (Step S503). Then, the control server 5 performs the subsequent process starting from the top entry (Step S504).

First, the control server 5 determines whether the reception interval value "Tn" that is included in the entry selected at Step S504 is within the range of "Tawe−3×S≤Tn≤Tave+3×S" (Step S505). If the reception interval value "Tn" is within the range of "Tawe−3×S≤Tn≤Tave+3×S" (Yes at Step S505), the control server 5 determines whether the reception interval representative value "T" is stored in a predetermined memory (Step S506).

If the reception interval representative value "T" is stored in a predetermined memory (Yes at Step S506), the control server 5 determines whether "T" is smaller than "Tn" (Step S507). If "T" is smaller than "Tn" (Yes at Step S507), the control server 5 overwrites "T" stored in the memory with "Tn" (Step S508).

Then, the control server 5 determines whether the selected entry is the last entry (Step S509). If the selected entry is not the last entry (No at Step S509), the control server 5 selects the subsequent entry (Step S510) and performs the process at Step S505. In contrast, if the selected entry is the last entry (Yes at Step S509), the control server 5 sets a value with a 10% increase in the reception interval representative value "T" as a new notification block timer value.

Then, the control server 5 updates the apparatus management table 31 and deletes the history acquisition flag (Step S511). Specifically, the control server 5 updates the notification block timer value, which is associated with the manufacturer code, the product code, and the property name that are associated with the list that is being selected, to a new notification block timer value. Furthermore, the control server 5 updates, from "1" to "0", the value of the history acquisition flag associated with the manufacturer code, the product code, and the property name associated with the list that is being selected.

Subsequently, the control server 5 determines whether a list that has not been subjected to process is present (Step S512). If a list that has not been subjected to process is present (Yes at Step S512), the control server 5 proceeds to the subsequent list (Step S513) and performs the process at Step S503. In contrast, if a list that has not been subjected to process is not present (No at Step S512), the control server 5 deletes the data in the reception interval table 32 (Step S514) and then ends the process.

If "T" is equal to or greater than "Tn" (No at Step S507), the control server 5 skips the process at Step S508. Furthermore, if the reception interval representative value "T" is not stored in the predetermined memory (No at Step S506), the control server 5 retains "Tn" as the reception interval representative value "T" in the memory (Step S515) and performs the process at Step S509. Furthermore, if the reception interval value "Tn" is not within the range of "Tave−3×S≤Tn≤Tave+3×S" (No at Step S505), the control server 5 performs the process at Step S509.

Advantage of the Gateway Device 10

As described above, if the gateway device 10 receives, from the air conditioning apparatus 11, a state change notification indicating that the setting of a predetermined item, such as the setting temperature or the like, has been changed, the gateway device 10 performs the following process. Namely, the gateway device 10 determines whether a state change notification related to the same item is received from the air conditioning apparatus 11 before a predetermined standby time has elapsed since the state change notification was received. If the state change notification related to the same item is not received from the air conditioning apparatus 11 before the predetermined standby time has elapsed since the state change notification was received, the gateway device 10 sends the last state change notification received from the air conditioning apparatus 11 to the control server 5.

Consequently, the gateway device 10 can reduce the number of unwanted processes performed by the control server 5. For example, if the setting temperature of the air conditioning apparatus 11 is continuously changed by an operation, such as an up/down button being pressed, the gateway device 10 sends only the last state change notification to the control server 5 instead of sending intermediate state change notifications to the control server 5. Thus, the gateway device 10 can prevents a process for the undetermined setting from being performed by the control server 5 and can allow the control server 5 to perform only the process for the final setting.

Furthermore, the gateway device 10 receives a state change notification that includes therein both the apparatus ID and the property name. Furthermore, the gateway device 10 determines whether a new state change notification that includes therein the same combination of the apparatus ID and the property name as that included in the immediately previous received state change notification is received before a predetermined standby time has elapsed since the immediately previous state change notification was received. Consequently, the gateway device 10 can easily determine whether the newly received state change notification is one of the state change notifications that are subsequent to the immediately previous state change notification and that are issued by continuous operations.

Furthermore, the gateway device 10 stores therein a notification block timer value by associating the value with a combination of the apparatus ID and the property name. Furthermore, when the gateway device 10 receives a state change notification, the gateway device 10 reads a notification block timer value that is stored and that is associated with the received state change notification. Then, the gateway device 10 determines whether a state change notification related to the same item is received from the same apparatus before the time period indicated by the read notification block timer value has elapsed since the state change notification was received.

Consequently, the gateway device 10 can wait for the arrival of the subsequent state change notification for an appropriate time period that is suitable for the apparatus and the setting content. For example, between a case in which the setting temperature of the air conditioning apparatus 11 is continuously changed and a case in which the setting airflow volume of the air conditioning apparatus 11 is continuously changed, the time intervals of the arrival of the subsequent state change notification differ. Furthermore, between a case in which the setting temperature or the setting airflow volume of the air conditioning apparatus 11 are continuously changed and a case in which the setting brightness of the lighting apparatus 12 is continuously changed, the time intervals of the arrival of the subsequent state change notification differ. Furthermore, the intervals of the notifications when state change notifications of the apparatuses are continuously issued are conceived to be the statistically periodical timing and the intervals of multiple notifications operated by a person are conceived to be the statistically unique value. Accordingly, because the gateway device 10 waits for the arrival of the subsequent state change notification for an appropriate time period that is suitable for the apparatus and the setting content, even if various apparatuses are installed in the home 2, the gateway device 10 can send a state change notification that indicates the final setting content to the control server 5.

Furthermore, on the basis of the average value of the time intervals of the reception of state change notifications, the gateway device 10 calculates a reception interval candidate value for each combination of the apparatus ID and the property name. Then, the gateway device 10 waits for the arrival of the subsequent state change notification during the time period indicated by the notification block timer value that is obtained on the basis of the calculated reception interval candidate value. Specifically, the gateway device 10 stores therein the time intervals of state change notifications. Then, the gateway device 10 selects, for each combination of the apparatus ID and the property name, a predetermined number of time intervals at each of which a state change notification is received and then calculates the average value of the selected time intervals. Then, if each of the selected time intervals is within a predetermined range of the calculated average value, the gateway device 10 sets, from among the selected time intervals, the time interval with the maximum value as a reception interval candidate value.

Specifically, the gateway device 10 calculates a reception interval candidate value by excluding a reception interval that is greatly different from the average value of some reception intervals. Then, the gateway device 10 waits for the arrival of the subsequent state change notification during the time period indicated by the notification block timer value on the basis of the calculated time interval candidate value. Consequently, the gateway device 10 can waits for the arrival of the subsequent state change notification for the time period that is in accordance with the input timing at which a user involuntarily changes the setting content.

Furthermore, the gateway device 10 stores therein the received state change notification for each combination of the apparatus ID and the property name. When the gateway device 10 newly receives a state change notification in which the same apparatus ID and the property name as that stored in the stored state change notification are stored, the gateway device 10 overwrites the stored state change notification with the newly received state change notification. Thereafter, if the gateway device 10 does not receive a new state change notification before a predetermined standby time has elapsed, the gateway device 10 sends the stored state change notification, i.e., the final received state change notification, to the control server 5. Consequently, the gateway device 10 can send, for each setting content that is continuously changed in each of the apparatuses 11 to 13, only the final received state change notification to the control server 5 without performing complicated processes.

Furthermore, when the gateway device 10 receives a state change notification indicating that a setting that is not continuously changed, such as an ON/OFF setting of the power supply, has been changed, the gateway device 10 sends the state change notification to the control server 5 without waiting and processing anything. Consequently, the gateway device 10 can allow the control server 5 to promptly start a process in accordance with the setting change of the item that is not continuously changed.

Furthermore, the control system 1 includes the control server 5 that controls the apparatuses 11 to 13 and 15 to 17 installed in the homes 2 and 3, respectively, and includes the gateway devices 10 and 14 that sends a notification to the control server 5 indicating that the setting of the apparatuses 11 to 13 and 15 to 17 installed in the homes 2 and 3, respectively, has been changed. Furthermore, when the gateway device 10 receives a state change notification related to the property of an apparatus, the gateway device 10 determines whether a new state change notification related to the same property is received from the same apparatus before a predetermined time period has elapsed since the state change notification was received. When the gateway device 10 does not receive a new state change notification related to the same property from the same apparatus before a predetermined time period has elapsed since the state change notification was received, the gateway device 10 sends the state change notification received from the apparatus to the control server 5. Consequently, the control system 1 can eliminate an unwanted process performed by the control server 5.

Furthermore, each of the gateway devices 10 and 14 sends, to the control server 5, a time interval candidate value in accordance with the reception intervals at each of which a state change notification is received. Furthermore, the control server 5 decides a notification block timer value by using the time interval candidate value received from each of the gateway devices 10 and 14 and then notifies each of the gateway devices 10 and 14 of the decided notification block timer value. Thereafter, when the gateway device 10 receives the state change notification, the gateway device 10 waits for the subsequent state change notification until the time period indicated by the notification block timer value received as a notification from the control server 5 has elapsed. Consequently, the control system 1 can decide a notification block timer value that is obtained by excluding, for example, a unique reception interval in a specific gateway device.

Furthermore, the control server 5 calculates the standard deviation and the average value of the received time interval candidate values and extracts, from among the received time interval candidate values, a time interval candidate value that is within the range obtained on the basis of the calculated average value and the standard deviation. Then, the control server 5 sets, as a notification block timer value, a value obtained by multiplying the maximum value of the time interval candidate from among the extracted time interval candidate value by a predetermined rate. Consequently, even if notification block timer values are unified in the entirety of the control system 1, the control system 1 can allow each of the gateway devices 10 and 14 to wait for sufficient time in order to receive the subsequent state change notification.

[b] Second Embodiment

In the above explanation, a description has been given of the embodiment according to the present invention; however, the embodiment is not limited thereto and can be implemented with various kinds of embodiments other than the embodiment described above. Therefore, another embodiment included in the present invention will be described as a second embodiment.

(1) Notification Block Timer Value

The gateway device 10 described above waits for the subsequent state change notification to arrive for the elapse of the time period indicated by the notification block timer value, which has been decided on the basis of the reception interval candidate value that is received by the control server 5 from each of the gateway devices 10 and 14; however, the embodiment is not limited thereto. For example, when the gateway device 10 calculates a reception interval candidate value, the gateway device 10 may also use the calculated reception interval candidate value as a notification block timer value for the gateway device 10. Furthermore, the gateway device 10 may also use the calculated reception interval candidate as a notification block timer value until a notification block timer value is notified by the control server 5.

As described above, the gateway device 10 uses the reception interval candidate value, which is obtained on the basis of the average value of the time intervals at each of which the gateway device 10 receives the state change notifications, as a notification block timer value and then waits for the subsequent state change notification to arrive for the time period indicated by the notification block timer value. Consequently, because the gateway device 10 reflects the characteristic of each of the apparatuses 11 to 13 installed in the home 2 onto a notification block timer value, the gateway device 10 can wait for the subsequent state change notification for an appropriate time period.

For example, for the apparatuses 11 to 13 installed in the home 2 and the apparatuses 15 to 17 installed in the home 3, the notification timings slightly differ depending on an apparatus even if apparatuses with the same type are used. Consequently, instead of using a notification block timer value calculated by the control server 5 in accordance with a timing at which each of the apparatuses 11 to 13 and 15 to 17 in the homes 2 and 3, respectively, sends a notification, the gateway device 10 uses a notification block timer value that is in accordance with the timing at which each of the apparatuses 11 to 13 installed in the home 2 sends a notification. Consequently, because the gateway device 10 reflects the characteristic of each of the apparatuses 11 to 13 onto a notification block timer value, the gateway device 10 can wait for the subsequent state change notification for an appropriate time period that is suitable for each of the apparatuses 11 to 13 installed in the home 2.

(2) Process for Determining the Notification Block Timer Value

The process for calculating a reception interval candidate value performed by the gateway device 10 described above is only an example and a reception interval candidate value may also be calculated by a different process. Furthermore, the process for deciding, by the control server 5, a notification block timer value by using the reception interval candidate value received from each of the gateway devices 10 and 14 described above is only an example and a notification block timer value may also be set by a different process. Furthermore, the control server 5 may also use notification block timer value decided by a user from the reception interval table 32 via the user terminal 6.

Furthermore, in the processes described above, arbitrary values may be used for various parameters that are used when the gateway device 10 selects a reception interval candidate value and that are used when the control server 5 calculates a reception interval representative value or a notification block timer value.

(3) Property Name

In the first embodiment described above, a description has been given of the air conditioning apparatus 11, the lighting apparatuses 12 and 13, and the like as examples of apparatuses installed in the homes 2 and 3; however, the embodiment is not limited thereto. For example, audio equipment or the like may also be installed. Furthermore, in the first embodiment, a description has been given of the setting temperature, the setting airflow volume, the setting brightness, and the ON/OFF state as an example of the property name that indicates an item; however, the embodiment is not limited thereto. For example, the property name may also be the setting volume of a sound of audio equipment, the saturation or the hue of a lighting apparatus, or the like.

(4) Setting Change Method

In the first embodiment described above, a description has been given of an example in which the setting is continuously changed by the up/down button being pressed; however, the embodiment is not limited thereto. Namely, each of the apparatuses 11 to 13 can receive a setting change in an arbitrary item performed by using an arbitrary operation unit with, for example, a dial type, a sliding type, or the like.

(5) Program

Instead of using the CPU 10a, the gateway device 10 may also execute the communication program 10f by using an arithmetic unit, such as an MPU, an FPGA, or the lie. Furthermore, instead of using the CPU 5a, the control server 5 may also execute the control program 5f by using an arithmetic unit, such as a micro processing unit (MPU), a field programmable gate array (FPGA), an application specific integrated circuit (ASIC), or the like.

Furthermore, the communication program 10f and the control program 5f described above are not needed to be stored in the memories 5b and 10b. For example, the communication program 10f and the control program 5f are stored in a "portable physical medium", such as a standard external memory, a standard IC CARD, or the like. Then, the gateway device 10 or the control server 5 may also acquire the corresponding program from the portable physical medium. Furthermore, the gateway device 10 or the control server 5 may also acquire the corresponding program stored in another computer or a server device via a public circuit, the Internet, a LAN, a wide area network (WAN), or the like.

(6) Embodiment

In the first embodiment described above, the control server 5 controls each of the apparatuses 11 to 13 and 15 to 17; however, the embodiment is not limited thereto. For example, a system other than the control server 5, such as a cloud system or the like, may also perform the same process as that performed by the control server 5. Furthermore, in the first embodiment described above, a description has been given of an example in which the control server 5 and the gateway device 10 execute each of the programs thereby various functions are performed; however, the embodiment is not limited thereto. The same functions may also be performed by using the ASIC or various circuits.

According to an aspect of an embodiment of the present invention, it is possible to eliminate an unwanted process performed by a control server.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A control system comprising:
a server device that controls multiple apparatuses installed in multiple homes; and
multiple communication devices each of which sends a notification to the server device indicating that setting of an apparatus installed in one of the multiple homes has been changed, wherein
each of the communication devices being arranged between the apparatus installed in one of the multiple homes and the server device and includes
a memory; and
a processor coupled to the memory and configured to:
determine, when setting information which is changed in stages and related to a predetermined item is received from a predetermined apparatus which sends setting information to the communication device whether there is a change in the setting information, whether another piece of setting information which is changed in stages and related to the same predetermined item is newly received from the predetermined apparatus before a predetermined time period elapses after the setting information, which is changed in stages, is received, send, when it is determined that the another piece of setting information is not newly received from the predetermined apparatus before the predetermined time period elapses, the received setting information to the server device, and calculate the predetermined time period based on a reception interval of the setting information, which is changed in stages, from the predetermined apparatus, the server device includes a processor that controls the predetermined apparatus on the basis of the setting information sent from one of the communication devices, wherein the processor of the communication device sends the calculated predetermined time period to the server device, and determines whether another piece of setting information which is changed in stages and related to the same predetermined item is newly received from the predetermined apparatus before the predetermined time period elapses, until a notification of a new predetermined time period is received from the server device.

2. The control system according to claim 1, wherein the processor of each of the communication devices is further configured to calculate a candidate for the predetermined time period on the basis of an average value of time intervals at each of which setting information related to the predetermined item is received from the predetermined apparatus, and notify the server device of the calculated candidate for the predetermined time period, and the processor of the server device is further configured to decide the predetermined time period by using the candidate for the predetermined time period notified by each of the communication devices, and notify each of the communication devices of the decided predetermined time period, and the processor determines whether the another piece of setting information related to the predetermined item is newly received from the predetermined apparatus before the predetermined time period notified by the server device elapses.

3. The control system according to claim 2, wherein the processor calculates an average value of candidates for the predetermined time periods received from each of the communication devices and a standard deviation, extracts, from among the candidates for the predetermined time periods, one or more candidates for the predetermined time period with a value that is within a range obtained on the basis of the calculated average value and the standard deviation, and sets, as the predetermined time period, a value obtained by multiplying one candidate with a maximum value among the extracted one or more candidates, by a predetermined rate.

* * * * *